United States Patent
Fish et al.

(10) Patent No.: US 11,682,316 B2
(45) Date of Patent: Jun. 20, 2023

(54) NOTEBOOK WITH CONFIGURABLE NOTE-TAKING GUIDES AND ORGANIZATIONAL FEATURES

(71) Applicant: WORKLIFE BRANDS LLC, Framingham, MA (US)

(72) Inventors: Robert Fish, Worcester, MA (US); James Bishai, Dorchester, MA (US); Jessica Hedge, Waltham, MA (US); Seda Evis, San Diego, CA (US); Ayse Birsel, New York, NY (US); Leah Caplan, Glen Ridge, NJ (US)

(73) Assignee: WORKLIFE BRANDS LLC, Framingham, MA (US)

( * ) Notice: Subject to any disclaimer, the term of this patent is extended or adjusted under 35 U.S.C. 154(b) by 89 days.

(21) Appl. No.: 17/083,986

(22) Filed: Oct. 29, 2020

(65) Prior Publication Data

US 2021/0134180 A1 May 6, 2021

Related U.S. Application Data

(60) Provisional application No. 62/928,866, filed on Oct. 31, 2019.

(51) Int. Cl.
*B42D 1/00* (2006.01)
*B42D 3/10* (2006.01)
(Continued)

(52) U.S. Cl.
CPC .............. *G09B 19/00* (2013.01); *B42D 1/001* (2013.01); *B42D 1/004* (2013.01); *B42D 1/006* (2013.01);
(Continued)

(58) Field of Classification Search
CPC .......... B42D 1/001; B42D 3/10; B42D 9/002; B42D 15/0006
(Continued)

(56) References Cited

U.S. PATENT DOCUMENTS 2,297,806 A * 10/1942 Smith ................. B43K 23/002
    211/DIG. 1
5,056,824 A * 10/1991 Olson ....................... B42F 5/00
    D19/27

(Continued)

FOREIGN PATENT DOCUMENTS

JP           3108715 U  *  4/2005
KR     20090002088 U  *  3/2009

OTHER PUBLICATIONS

KR20090002088U English Translation (Year: 2009).*
(Continued)

*Primary Examiner* — Kyle R Grabowski
(74) *Attorney, Agent, or Firm* — Sheridan Ross P.C.

(57) ABSTRACT

A notebook is provided comprising a number of expert guidance pages and instructional figures. The notebook includes integrated guidance and information sheets that describe using different note-taking methods. The notebook may include supplemental pages that teach and reinforce note-taking methods and approaches, as well as a variety of other pages designed to provide a functional notebook. One or more of the pages, including the supplemental pages, can be removed by tearing along a perforated edge.

20 Claims, 20 Drawing Sheets

(51) Int. Cl.
   *B42D 9/00* (2006.01)
   *G09B 19/00* (2006.01)
   *B42D 15/00* (2006.01)

(52) U.S. Cl.
   CPC ............. *B42D 1/007* (2013.01); *B42D 1/009* (2013.01); *B42D 3/10* (2013.01); *B42D 9/002* (2013.01); *B42D 15/0006* (2013.01); *B42P 2241/04* (2013.01); *B42P 2241/18* (2013.01)

(58) Field of Classification Search
   USPC ...................................... 281/30, 31; 116/234
   See application file for complete search history.

(56) References Cited

U.S. PATENT DOCUMENTS

| 5,713,606 | A | * | 2/1998 | Kleinberg | ............. | B42D 1/005 |
|---|---|---|---|---|---|---|
| | | | | | | 281/38 |
| 2005/0081776 | A1 | * | 4/2005 | Moranville | ............ | B42D 9/004 |
| | | | | | | 116/238 |
| 2007/0086846 | A1 | * | 4/2007 | Hough et al. | .......... | B42D 5/042 |
| | | | | | | 281/38 |

OTHER PUBLICATIONS

JP3108715U English Translation (Year: 2005).*
Official Action for Canada Patent Application No. 3097643, dated Mar. 9, 2022, 3 pages.

\* cited by examiner

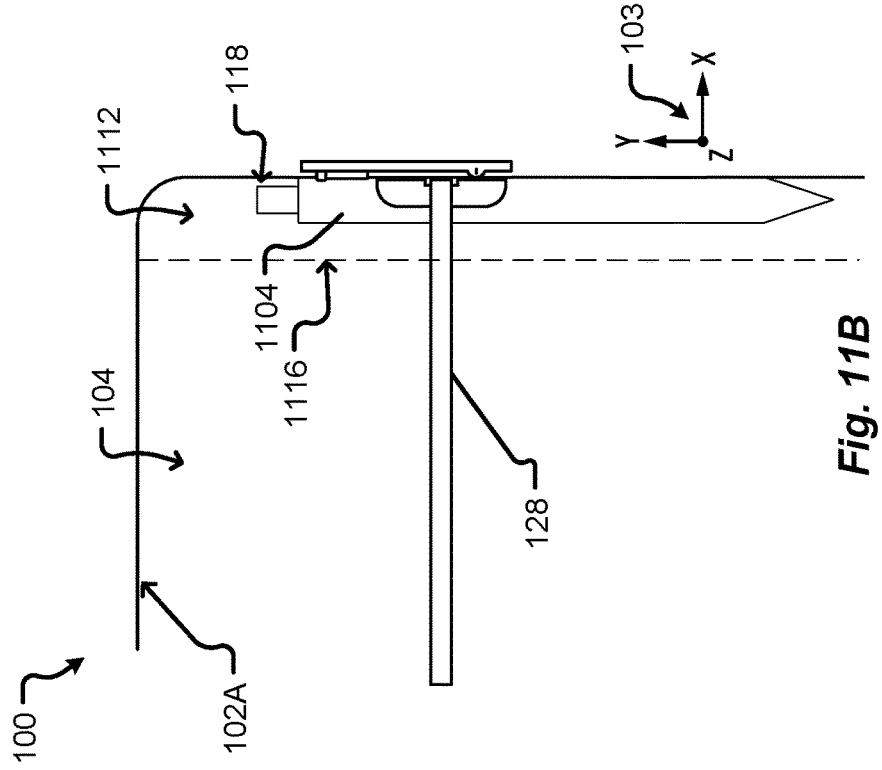
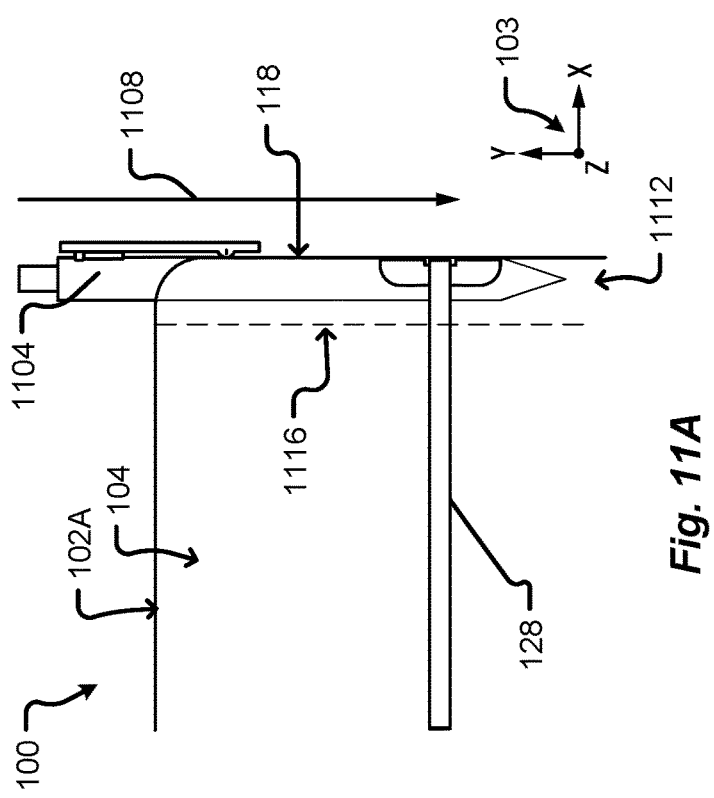
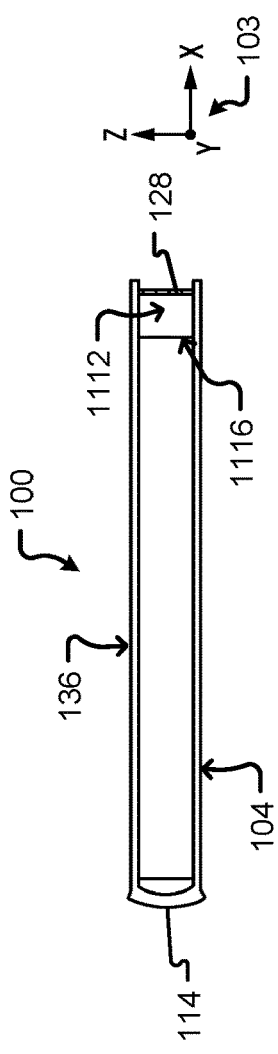
*Fig. 11A*
*Fig. 11B*
*Fig. 11C*

NOTEBOOK WITH CONFIGURABLE NOTE-TAKING GUIDES AND ORGANIZATIONAL FEATURES

CROSS-REFERENCE TO RELATED APPLICATION

The present application claims the benefit of and priority, under 35 U.S.C. § 119, to U.S. Provisional Application Ser. No. 62/928,866, filed Oct. 31, 2019, entitled "Notebook with Configurable Note-Taking Guides and Organizational Features" the entire disclosure of which is hereby incorporated herein by reference, in its entirety, for all that it teaches and for all purposes.

BACKGROUND

The present disclosure is generally directed to methods of note-taking, and in particular to note-taking with structure and guidance for the notetaker.

Regardless of advancements in technology, businesses, governmental agencies, and academic institutions typically require keeping a paper-based record of notes, ideas, and meetings. The structure of these notebooks has changed very little over the years. Most notebooks comprise an ordered compilation of pages that are bound together between a front and rear cover.

The pages of a notebook are either blank or marked, for example, with lines, grids, dots, or the like. A lined notebook may allow a notetaker to write notes in full text while a grid-based notebook may allow a notetaker the flexibility to write notes, draw pictures, and/or make sketches to scale. Dot-based notebooks offer the flexibility of the grid-based notebook without the perceived restriction of enclosed boxes. As such, using a dot-based notebook, a notetaker may make free sketches, write notes in full text, and even sketch to scale, without feeling confined by a lined or grid-based presentation.

As can be appreciated, there are many choices for a notetaker to consider when selecting a notebook. Most notetakers are not aware of the different notebooks that are available, and most do not know the various note-taking strategies that are associated with a particular type of notebook. A notetaker may select a type of notebook based on their preferred note-taking style or simply based on a personal preference. Moreover, once a notetaker selects a particular type (e.g., lined, grid, dot, blank) of notebook, that notetaker is generally limited to the taking notes according to the selection made. As can be appreciated, the lack of flexibility in notetaking and guidance in current notebooks is frustrating and limiting.

BRIEF SUMMARY

It is with respect to the above issues and other problems that the embodiments presented herein were contemplated. In general, embodiments of the present disclosure provide a notebook including a number of features designed to help users become better notetakers and guide them through several different methods of notetaking. The features include hidden storage pockets, magnetic pen loop attachments, and creative interior formats. The interior formats include, among other things, pages structured in accordance with various note-taking methods. These note-taking methods include, but are in no way limited to, the Cornell method, outlining, mind mapping, charting, storyboarding, and sketching to name a few. As can be appreciated, the pages may include a combination of lined, partially-lined, blank, partially-blank, and/or otherwise marked sheets. In some embodiments, the marked sheets may suit a particular type of note-taking.

Additionally or alternatively, the pages may include instruction sheets to assist a user in the proper way to take notes according to a number of different note-taking methods. This approach allows a notetaker to make the notebook adapt to the type of notes or method used at any given time without limiting the user to a single note-taking approach or notebook type.

In some embodiments, a notebook is provided containing expert guidance and instructional figures, which can provide a user with better note-taking skills and an overall enhanced note-taking experience. This notebook can provide individuals with a wide range of note-taking techniques and tips. In some embodiments, the notebook can contain summarized instructions, or guidance sheets, on the most common and established methods of note-taking, affording users a better note-taking experience. For example, the notebook may provide instructions on the Cornell method of note-taking, as well as helpful tips placed in the footer of each page to encourage the user to implement a particular note-taking method (e.g., the Cornell method, mind mapping, etc.) when taking notes.

In some embodiments, a notebook is provided, comprising: a front cover; a back cover; a spine disposed between the front cover and the back cover, wherein the front cover and the back cover are both connected to the spine, wherein the notebook has a closed state concealing an interior of the notebook and an open state revealing an interior of the notebook; and a closure comprising an elastic band that attaches to a portion of the notebook, wherein the closure engages with a notch disposed in at least one of the front cover and the back cover in the closed state.

Aspects of the above notebook include a magnetic pen loop disposed along a length of the spine, wherein the magnetic pen loop magnetically attaches to the spine and separates from the spine by overcoming a magnetic force holding the magnetic pen loop to the spine. Aspects of the above notebook include a plurality of note-taking pages bound at the spine of the notebook and disposed in the interior of the notebook; and an expert note-taking guidance page disposed within the interior of the notebook adjacent the plurality of note-taking pages, the expert note-taking guidance page including information about a plurality of note-taking styles, wherein the information includes a guide on how to use each of the plurality of note-taking styles. Aspects of the above notebook include wherein the expert note-taking guide folds out from the interior of the notebook and extends beyond a periphery of at least one of the front cover and the back cover. Aspects of the above notebook include wherein the plurality of note-taking pages follows the expert note-taking guidance page in the notebook, and wherein the plurality of note-taking pages includes different note-taking pages corresponding to at least one note-taking style in the plurality of note-taking styles. Aspects of the above notebook include a corner storage flap disposed on the front cover of the notebook, wherein the corner storage flap extends diagonally from a top edge of the front cover to the spine, and wherein a space between an the corner storage flap and the front cover is sized to receive an object. Aspects of the above notebook include wherein the corner storage flap is made from an elastic material and is joined to the notebook along the top edge of the front cover and along a portion of the spine. Aspects of the above notebook include a pocket disposed in the interior of the notebook attached to a portion of the front cover. Aspects of the above notebook include a first ribbon marker attached at a first end adjacent the spine of the notebook, wherein the first ribbon marker is free at an opposite second end thereof; a second ribbon marker attached at a first end adjacent the spine of the notebook, wherein the second ribbon marker is free at an opposite second end thereof; and a third ribbon marker attached at a first end adjacent the spine of the notebook, wherein the third ribbon marker is free at an opposite second end thereof. Aspects of the above notebook include wherein the first ribbon marker, the second ribbon marker, and the third ribbon marker are of different lengths.

In some embodiments, a notebook is provided, comprising: a front cover; a rear cover; a spine positioned between and connecting to the front cover and the rear cover; a plurality of note-taking pages bound together and attached to at least one of the front cover, the rear cover, and the spine, the plurality of note-taking pages comprising groups of pages arranged by note-taking style; and an expert guidance sheet attached to at least one of the front cover, the rear cover, and the plurality of note-taking pages, the expert guidance sheet comprising a plurality of visual indicia indicative of how to use each note-taking style in the groups of pages of the plurality note-taking pages.

Aspects of the above notebook include wherein the front cover pivots relative to at least one of the spine and the rear cover, wherein the rear cover pivots relative to at least one of the spine and the front cover, and wherein the notebook is moveable between a closed state where the front cover and the rear cover overlap and face one another and an open state where the front cover and the rear cover are arranged side-by-side on opposing edges of the spine and are each facing a same direction. Aspects of the above notebook include an elastic band attached to at least one of the front cover, the rear cover, and the spine; and a notch attached to at least one of the front cover and the rear cover, the notch arranged along an opening edge of the notebook, wherein the elastic band maintains the notebook in the closed state when engaged with the notch, the front cover, and the rear cover, and wherein the elastic band, when released from the notch and at least one of the front cover and rear cover, allows unrestricted movement of the front cover relative to the rear cover. Aspects of the above notebook include wherein the expert guidance sheet is at least one of inserted into a pocket disposed in the front cover and attached to the plurality of note-taking pages and selectively separable along a perforated separation line. Aspects of the above notebook include wherein the plurality of note-taking pages comprises a first group of pages comprising at least one page of a first note-taking style followed by at least one page of a second note-taking style and then followed by at least one page of a third note-taking style, wherein the first note-taking style, the second note-taking style, and the third note-taking style are different from one another and each provide a page area for taking notes according to a corresponding note-taking style illustrated in the visual indicia of the expert guidance sheet. Aspects of the above notebook include wherein the at least one page of the first note-taking style comprises a first one of a horizontally-lined area, an unlined sketch area, a dot-grid area, a lined grid area, a split lined and sketch area, and a mind-map area, the at least one page of the second note-taking style comprises a different second one of the horizontally-lined area, the unlined sketch area, the dot-grid area, the lined grid area, the split lined and sketch area, and the mind-map area of the at least one page of the first note-taking style, and wherein the at least one page of the third note-taking style comprises a different third one of the horizontally-lined area, the unlined sketch area, the dot-grid area, the lined grid area, the split lined and sketch area, and the mind-map area of the at least one page of the first note-taking style and the at least one of the second note-taking style. Aspects of the above notebook include wherein the split lined and sketch area comprises: a page number area; a date section area; a first section comprising a plurality of horizontal lines; a second section devoid of horizontal lines; and a third section comprising a plurality of horizontal lines, the plurality of horizontal lines of the third section spanning a smaller horizontal space than the plurality of horizontal lines of the first section. Aspects of the above notebook include a pocket disposed on a face of at least one of the front cover and the rear cover, wherein the pocket is arranged as a slotted portion of the face of the at least one of the front cover and the rear cover. Aspects of the above notebook include an integrated archival sticker comprising an adhesive layer disposed on a first face and a writing layer disposed on a second face opposite the first face, the integrated archival sticker separably attached via the adhesive layer to a release liner disposed in the notebook and attached to at least one of the front cover, the rear cover, and the plurality of note-taking pages.

In some embodiments, a notebook is prepared by a process comprising: providing a foldable cover having an interior surface and an exterior surface, the foldable cover comprising: a front cover; a rear cover; and a spine disposed between and interconnected to the front cover and the rear cover; attaching, to the interior surface of the foldable cover, a plurality of note-taking pages bound together and comprising groups of pages arranged by note-taking style; and attaching, to at least one of the interior surface of the foldable cover and the plurality of note-taking pages, an expert guidance sheet comprising a plurality of visual indicia indicative of how to use each note-taking style in the groups of pages of the plurality note-taking pages, wherein the plurality of note-taking pages comprises a first group of pages comprising at least one page of a first note-taking style followed by at least one page of a second note-taking style and then followed by at least one page of a third note-taking style, wherein the first note-taking style, the second note-taking style, and the third note-taking style are different from one another and each provide a page area for taking notes according to a corresponding note-taking style illustrated in the visual indicia of the expert guidance sheet, and wherein the at least one page of the first note-taking style comprises a first one of a horizontally-lined area, an unlined sketch area, a dot-grid area, a lined grid area, a split lined and sketch area, and a mind-map area, the at least one page of the second note-taking style comprises a different second one of the horizontally-lined area, the unlined sketch area, the dot-grid area, the lined grid area, the split lined and sketch area, and the mind-map area of the at least one page of the first note-taking style, and wherein the at least one page of the third note-taking style comprises a different third one of the horizontally-lined area, the unlined sketch area, the dot-grid area, the lined grid area, the split lined and sketch area, and the mind-map area of the at least one page of the first note-taking style and the at least one of the second note-taking style.

In some embodiments, a notebook is provided, comprising: a front cover; a back cover; spine positioned between and connecting to the front cover and the back cover; a horizontal elastic band comprising a first end attached to a first portion of the front cover and a second end attached to a second portion of the back cover; and a plurality of note-taking pages bound to the spine and enclosed in an interior of the notebook between the front cover and the back cover, wherein the horizontal elastic band extends over an opening edge of the notebook from the front cover to the back cover and engages with a notch to hold the notebook in a closed orientation.

Aspects of the above notebook include an expert guidance insert, wherein the expert guidance insert is either attached to an inside cover of the front cover or inserted into a pocket disposed on the inside cover of the front cover, and wherein the expert guidance insert comprises a plurality of visual indicia indicative of how to use a plurality of note-taking styles. Aspects of the above notebook include wherein the plurality of note-taking pages comprises at least one notetaking page corresponding to at least one of the plurality of note-taking styles. Aspects of the above notebook include wherein the at least one note-taking page comprises: a page number; a date section; a first section comprising a plurality of horizontal lines; a second section devoid of horizontal lines; and a third section comprising a plurality of horizontal lines, the plurality of horizontal lines of the third section spanning a smaller horizontal space than the plurality of horizontal lines of the first section. Aspects of the above notebook include wherein the at least one note-taking page comprises: a page number; a plurality of horizontal lines, the plurality of horizontal lines comprising a uppermost horizontal line and a lowermost horizontal line, wherein the uppermost horizontal line comprises a plurality vertical lines extending toward the lowermost horizontal line, wherein the lowermost horizontal line comprises a plurality of vertical lines extending toward the uppermost horizontal line, and wherein the plurality of vertical lines of the uppermost horizontal line and the plurality of vertical lines of the lowermost horizontal line are vertically aligned. Aspects of the above notebook include wherein the at least one note-taking page further comprises: at least one reminder, the at least one reminder containing instructions on how to utilize at least one of the plurality of note-taking styles; and a corner flap disposed on a corner of the at least one note-taking page, wherein the corner flap includes a perforated edge and is configured to fold onto the at least one note-taking page. Aspects of the above notebook include wherein the at least one note-taking page comprises: a first section comprising a first array of dots; and a second section comprising a second array of dots, wherein the second array of dots includes fewer rows of dots than the first array of dots. Aspects of the above notebook include wherein the at least one note-taking page comprises: a first section comprising a heading line and a date line; and a second section comprising an array of evenly spaced markers, wherein the second section spans at least half of the at least one note-taking page. Aspects of the above notebook include a reflection page, wherein the reflection page includes a signature line and a plurality of horizontal lines.

In some embodiments, a notebook resulting from a process is provided, the process including: providing a structure, the structure comprising a front cover, a back cover, and a spine connecting the front cover and the back cover; providing a plurality of notebook pages, each notebook page connected to the spine and disposed between the front cover and the back cover, wherein the plurality of notebook pages comprises at least an expert guidance page and a plurality of sections following the expert guidance page, wherein the expert guidance page provides information about a plurality of note-taking styles, wherein the information comprises a guide on how to use each of the plurality of note-taking styles, and wherein the plurality of sections comprises different note-taking pages corresponding to at least one note-taking style of the plurality of note-taking styles.

In one embodiment, at least one guidance sheet may be bound to the notebook with a perforated edge. In some embodiments, these guidance sheets may be disposed at the beginning of a notebook and/or throughout the notebook at various sections. In any event, the perforated edge may be separated and the guidance sheet may be removed from the notebook. In some embodiments, the guidance sheets may be made from a durable vellum material, which may be folded out from a notebook for reference.

Additionally or alternatively, the content associated with the guidance sheets (e.g., summarizing and/or providing information associated with a particular note-taking method, approach, and/or tip, etc.) may be incorporated into the notebook itself. For example, sketch pages (e.g., blank, dot, and/or grid-based, etc.) may include tips for sketching and taking notes while sketching. In some embodiments, sketch pages may be disposed in the notebook at regularly spaced intervals in the notebook to provide users with tips on sketching and/or encourage users to express creativity in a sketch approach. As can be appreciated, the notebook may include interspersed lined, grid-based, and/or dot-based, pages in a similar fashion. For instance, a note-taking method may encourage notetakers to sketch an idea (e.g., using a sketch page) and then write a summary on lined pages (e.g., following the sketch page). Various combinations of pages (e.g., different types of pages in different orders and/or groups) may be employed in the notebook to suit one or more of the approaches described herein.

In some embodiments, the expert guidance and instructional figures may appear in a tools page before the note-taking pages. For example, in some embodiments there may be a tools page offering various writing and note-taking tools that the user may reference at any time.

The notebook described herein may include a number of additional features that encourage a user to carry the notebook at all times. For instance, the notebook may include a phone holder, business card pocket, pen loop (e.g., magnetic pen loop, etc.), interior storage pockets (e.g., for addition paper, loose paper, receipts, etc.), and/or the like. Adding these features makes the notebook more of a personal organizational tool than a simple compilation of pages. In one embodiment, the notebook may include an elastic closure to keep the notebook closed while being carried. The elastic closure may locate on a cutout portion of the cover to prevent slipping and/or accidental removal. Additionally or alternatively, the notebook may include a number of embedded ribbon makers, which can be moved to particular sections of the notebook. In one embodiment, the notebook may include at least three of these markers. In one example, a first marker may be used to quickly locate a reference section of the notebook (e.g., the guidance sheet for a particular note-taking method, etc.), a second marker may be used to quickly locate a sketching section of the notebook, and a third marker may be used to locate the current note-taking position used by the notetaker. It should be appreciated, that these are only representative examples of uses of the ribbon markers, and the use of these markers are not limited to the examples described herein.

In one embodiment, one or more pages in the notebook may comprise scored, perforated, or foldable corners. For instance, the corners of the notebook may be scored with a line that a user may fold against to "dog ear," or fold down, to mark a page in the notebook. In some embodiments, these features may provide a bookmark, which can be employed for one or more pages, and in some cases each page, in the notebook.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Additional features and advantages are described herein and will be apparent from the following Delated Description and the figures

BRIEF DESCRIPTION OF THE DRAWINGS

FIGS. 11A-11C show various views of a writing instrument receptacle in accordance with embodiments of the present disclosure.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1A:
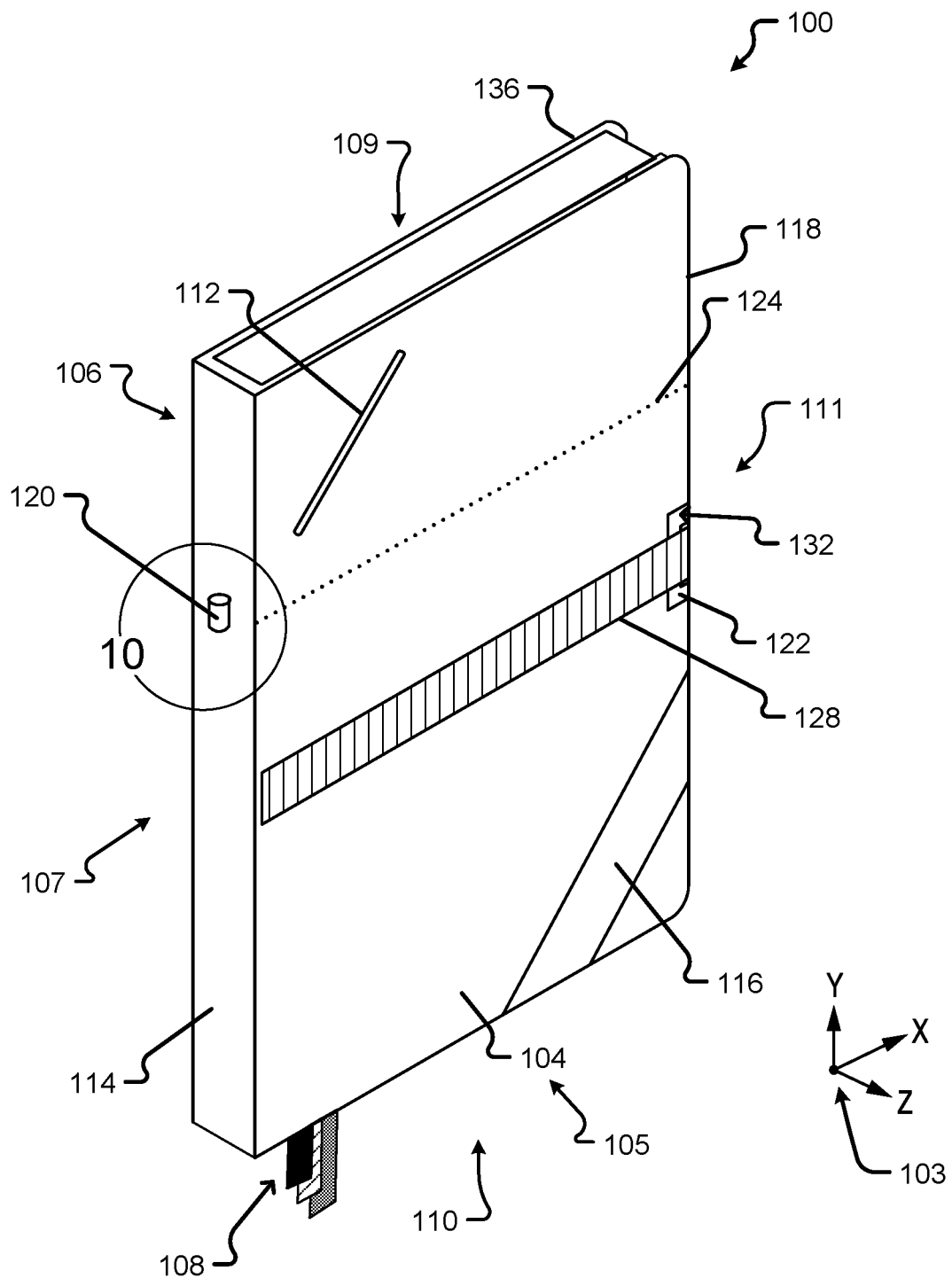
FIGS. 1A-1G show various views of a notebook including expert guidance features and arrangements in accordance with embodiments of the present disclosure.

Referring to FIG. 1A, a schematic perspective view of a notebook 100 is shown in accordance with embodiments of the present disclosure. The notebook 100 described herein provides expert guidance and instructional figures for note-taking. The notebook 100 may comprise a front 105, a rear 106, a binding, or spine, side 107, a top 109, a bottom 110, and an opening side 111. The binding side 107 may be the side on which the notebook 100 is bound (e.g., connected together at a spine, etc.) and cannot be opened, while the opening side 111 may be the side of the notebook 100 that is capable of opening to reveal pages in the notebook 100. The term "notebook" as referred to herein may refer to any arrangement of bound pages that allow notes to be taken in the form of written words, sketches, shorthand, and/or combinations thereof. The pages of the notebook 100 may include paper having blank, lined, grid, dot, portions, and/or combinations thereof arranged in any number of orders. The notebook 100 is not limited to use for note-taking and may include a number of features that aid in note-taking and/or in organization such as, for example, interior pockets, exterior pockets, hidden pockets, clasps, handles, compartments, pen holders, and/or the like.

In some embodiments, the notebook 100 may be configured as one or more different sizes. Examples of various sizes include, but are in no way limited to, travel-sized notebooks (e.g., 3.5×5.5 inches), casebound notebooks (e.g., 8.0×8.0 inches), 5.0×8.0 inch notebooks, 8.0×10.0 inch notebooks, 8.5×11.0 inch notebooks, metric sized notebooks, and/or the like.

In some embodiments, reference may be made to dimensions, angles, directions, relative positions, and/or movements associated with one or more components of the notebook 100 with respect to a coordinate system 103. The coordinate system 103, as shown in the accompanying figures, includes three-dimensions comprising an X-axis, a Y-axis, and a Z-axis. Additionally or alternatively, the coordinate system 103 may be used to define planes (e.g., the XY-plane, the XZ-plane, and the YZ-plane) of the notebook 100. These planes may be disposed orthogonal, or at 90 degrees, to one another. While the origin of the coordinate system 103 may be placed at any point on or near the notebook 100, for the purposes of description, the axes of the coordinate system 103 are disposed along the same directions from figure to figure. Additionally or alternatively, the directionality of the X-axis, Y-axis, and Z-axis may be flipped, as noted with negative directionality (i.e., the negative X-axis direction is the opposite direction of the X-axis direction illustrated by the direction of the associated arrow).

The notebook 100 may include a front cover 104, a rear cover 136, a plurality of ribbon markers 108, a corner storage flap 112, a large storage flap 116, a spine 114, a pen loop 120 a notched portion 132. The front cover 104 may extend from a top edge 102A to a bottom edge 102B and may connect to the spine 114. The front cover 104 may include an opening edge 118. The opening edge 118 may be the side from which the notebook 100 may be opened (e.g., transitioned from a closed state to an open state). The front cover 104 may be made from a flexible or rigid material. In some embodiments, a rigid material front cover 104 may provide stability and protect the inner pages and resist bending of the notebook 100. Rigid materials may include, but are in no way limited to, plastic, metal, cardboard, and/or combinations thereof. On the other hand, flexible materials may include, but are in no way limited to, soft plastic, cloth, leather, synthetic fabrics, etc., and/or combinations thereof. In any event, the front cover 104 may contain various patterns or colors in an effort to provide users with stylization and personalization. For example, some embodiments may contain various colors (e.g., black, grey, blue, etc.) and/or various patterns (e.g., polka dots, stripes, waves, etc.) marked on, in, or into the front cover 104. In some embodiments, the notebook 100 may comprise a number of elements associated with a theme. The theme may utilize any number of colors and/or artistic schemes designed to appeal to the user of the notebook 100. For example, some notebooks may be adorned with a theme containing flowers and/or pastel colors. The theme may span a portion or the entirety of the notebook 100.

The notebook 100 may comprise a space 148 disposed between the spine 114 and the pages within the notebook. Additionally or alternatively, the space 148 may be disposed between an edge of the interior pages of the notebook 100 and the opening edge 118 of the notebook 100. In some embodiments, the pages may be bound together and affixed to the notebook 100 without attachment of the pages to the spine 114 (e.g., via attachment of the individual pages together along a first edge, and attachment of the first and last pages to the inside front cover and inside rear cover of the notebook 100, respectively). In such embodiments, the space 148 may provide extra storage for the user, such as permitting the user to store a writing instrument (not shown). For instance, the space 148 may be configured, or sized, to receive a writing instrument (e.g., pen, pencil, marker, etc.), a clip of a writing instrument, and/or a body of the writing instrument.

The plurality of ribbon markers 108 may, among other things, be used to mark specific pages in the notebook 100. The plurality of ribbon markers 108 may contain any number of ribbons in any number of design and style choices (e.g., colors, lengths, textures, etc., and/or combinations thereof). In one embodiment, the plurality of ribbon markers 108 comprise at least three ribbons. The plurality of ribbon markers 108 may each have a different length, color, and/or texture. Each of the plurality of ribbon markers 108 may be affixed to the notebook (e.g., bound with the pages of the notebook 100, adhered to the spine of the notebook 100, etc.). In one embodiment, the plurality of ribbon markers 108 may extend from one side or edge of the notebook 100 to another side or edge of the notebook 100 (e.g., between a plurality of pages).

In some embodiments, the front cover 104 of the notebook 100 may include at least one of the corner storage flap 112 and the large storage flap 116. The storage flaps 112, 116 may be disposed on any location on the front cover 104. For instance, the corner storage flap 112 may be disposed in the top left-hand side corner of the notebook 100. In the embodiment shown in FIG. 1B, the corner storage flap 112 is disposed between the top edge 102A and the spine 114 of the notebook 100. The corner storage flap 112 may be sealed along a portion of the top edge 102A and the spine 114 of the notebook 100. The diagonal line running from the top edge 102A to the spine 114 may provide an opening, or open pocket edge, between a surface of the front cover 104 and the material of the corner storage flap 112. The material of the corner storage flap 112 may be a stretchable fabric and/or elastic. The corner storage flap 112 may provide a convenient pocket storage space for small elements (e.g., scraps of paper, erasers, flash drives, etc.). In some embodiments, the corner storage flap 112 may be used to store or hold paper elements (e.g. business cards, to-do lists, sticky notes, etc.). In some embodiments, the corner storage flap 112 may be a slot (e.g., similar to, or the same as, a slot of a hidden pocket 142). The slot may be disposed and visible on the front cover 104 of the notebook 100 and may provide a location for the storage of various elements (e.g., a user's notes, business cards, notecards, writing instruments, USB devices, and/or combinations thereof, etc.). The slot may be disposed vertically (e.g., parallel to the Y-axis), horizontally (e.g., parallel to the X-axis), or any angle therebetween (e.g., 30 degree angle, 45 degree angle, 60 degree angle, etc., from the X-axis). In some embodiments, the notebook 100 may comprise the corner storage flap 112 and the slot. The slot and/or the corner storage flap configurations of the respective components may be as shown, for example, on the front cover 104 as illustrated in the accompanying figures. The slot and the corner storage flap 112 may provide additional security for the elements stored therein (e.g., any element(s) extending out of the slot may be further secured to the front cover 104 of the notebook 100 by the corner storage flap 112). In one embodiment, corner storage flap 112 may be used to store or hold a credit card (not shown).

Figure 1B:
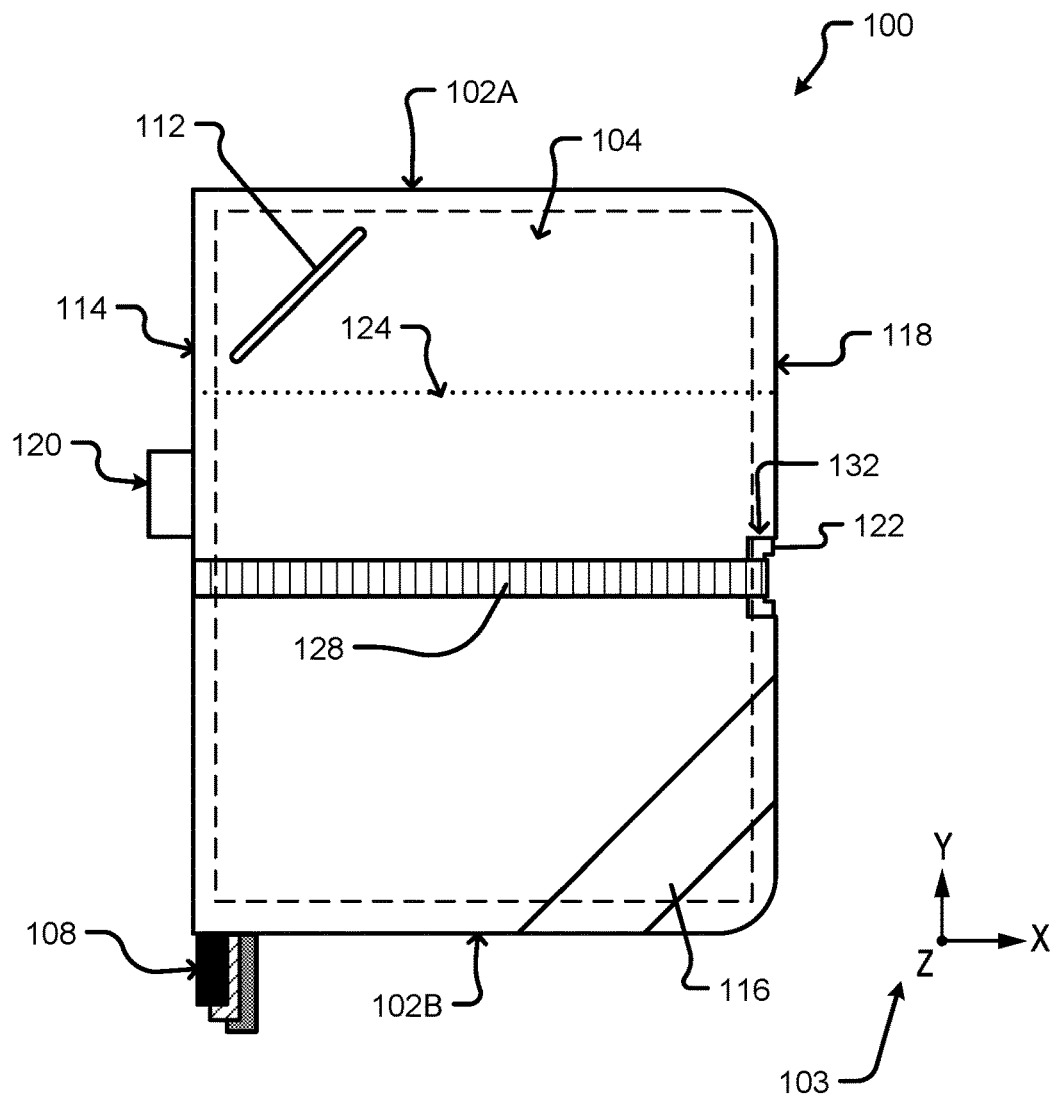
Figure 1C:
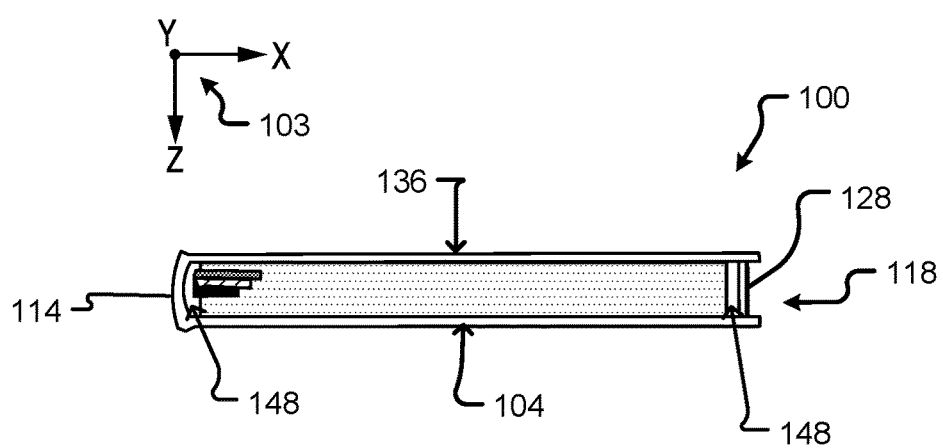

The large storage flap 116 may be used to hold larger objects than the corner storage flap 112. As shown in FIG. 1B, the large storage flap 116 may extend from the bottom edge 102B to the opening edge 118 of the notebook 100. The large storage flap 116 may be sealed along a portion of the bottom edge 102B and the opening edge 118 of the notebook 100. The diagonal line running from the bottom edge 102B to the opening edge 118 may provide an opening, or open pocket edge, between a surface of the front cover 104 and the material of the large storage flap 116. Similar, if not identical, to the corner storage flap 112, the material of the large storage flap 116 may be a stretchable fabric and/or elastic. In some embodiments, an elastic fabric may provide greater storage flexibility over a non-elastic material. Although shown arranged in the lower right-hand side corner of the notebook 100, the large storage flap 116 may be disposed on any portion of the front cover 104, and in some embodiments, may span a portion or an entirety of the notebook 100. The large storage flap 116 may provide a larger storage, or pocket, space than the corner storage flap 112 to provide additional or alternative storage to the corner storage flap 112. For example, the large storage flap 116 may allow the user to store large devices (e.g., phone, tablet, computer, satellite notebook, etc.). In some embodiments, the corner storage flap 112 and the large storage flap 116 may both simultaneously hold a large device against the front cover 104, where both the storage flaps 112, 116 secure different portions of the large device to the front cover 104. In some embodiments, the large storage flap 116 may be a strap. In other words, in such embodiments, the pocket may terminate before the corner containing the intersection of the bottom edge 102B and the opening edge 118, creating a strap with two openings between the strap and the front cover 104 of the notebook 100. The strap may overlap a portion of the front cover 104 to provide a structure or retaining element for storage purposes (e.g., to store a user's notes, notecards, business cards, electronic devices, writing instruments, and/or combinations thereof, etc.).

The notebook 100 may include the pen loop 120. The pen loop 120 may provide a location to store a writing instrument (not shown). The pen loop 120 may be configured to store any writing instrument. For example, the pen loop 120 may be configured to hold pens, highlighters, pencils, combinations thereof, and/or any other type of writing instrument. The pen loop 120 may be disposed on the spine 114 or the opening edge 118 of the notebook 100. In some embodiments, the pen loop 120 may comprise an elastic band that may adjust to completely encompass a periphery of the writing instrument. The pen loop 120 may also possess and adjustment device to allow the pen loop to be configured in such a way that it securely holds the writing instrument. The pen loop 120 may include a magnetic element that interconnects with a mating magnetic element disposed on the notebook 100. The magnetic element may correspond to a ferrous metal or alloy or a magnet. The mating magnetic element may correspond to a magnet that is magnetically attracted to the ferrous metal/alloy and/or the magnet. In some embodiments, the mating magnetic element may correspond to a ferrous metal/alloy that is attracted to the magnet in the magnetic element. In any event, this magnetic interconnection allows the writing instrument and the pen loop 120 to be quickly and easily detached and reattached to the notebook 100 via magnetic force. In one embodiment, the pen loop 120 may be attached to a section of the spine 114 of notebook 100, where it may be removed without affecting the structural integrity of the notebook 100.

In some embodiments, the notebook 100 may include an identifying design 124 disposed on the front cover 104. The identifying design 124 may provide a unique symbol, shape, or marking that allows a user to quickly identify a particular type of the notebook 100 (e.g., lined, grid-based, dot-based, blank, etc., and/or combinations thereof). For example, the identifying design 124 may be a solid line, indicating that the plurality of pages in the notebook 100 include pages with straight and solid lines. In one embodiment, the identifying design 124 may be a dotted line, illustrating to the user that the plurality of pages in the notebook 100 include pages having straight and dotted lines. The identifying design 124 may comprise any shape, element, and/or line that represents any line style for the notebook 100 and/or at least a portion of the plurality of pages in the notebook 100.

The notebook 100 may include an elastic band 128, or closure, attached to a portion of the notebook 100. In one embodiment, the elastic band 128 may stretch over the notebook 100 from the spine 114 to the opening edge 118. In some embodiments the elastic band, when stretched around the opening edge 118 (e.g., as shown in FIG. 1B), may maintain the notebook 100 in a closed position (e.g., holding the notebook 100 shut). The elastic band 128 may be released from the opening edge 118 to open the notebook 100. In some cases, the elastic band 128 may be attached to the spine 114 and/or otherwise affixed to a portion of the notebook 100. In some embodiments, upon stretching over the opening edge 118 of the notebook 100, the elastic band 128 may snap into or otherwise locate with a notched portion 132. The notched portion 132 may comprise an inset portion of material 122 (e.g., plastic, metal, etc.) having a notch or cutout disposed therein. The cutout of the inset portion of material 122 may be sized to accommodate a width of the elastic band 128. In some embodiments, the elastic band 128 of the notebook 100 may be oriented horizontally as shown in FIGS. 1A and 1B. However, in some embodiments, the elastic band 128 may be oriented vertically (e.g., disposed about 90 degrees to the horizontal arrangement shown in FIGS. 1A and 1B) to hold the notebook 100 closed (not shown). In this vertical arrangement, the one or more notched portions 132 may be disposed in the notebook 100 (e.g., a first notched portion disposed in the top edge 102A and a second notched portion disposed in the bottom edge 102B). In this arrangement, the elastic band 128 may wrap around the notebook 100 from the top edge 102A to the bottom edge 102B. In some embodiments, the elastic band 128 may be attached to the front cover 104 and the rear cover 136 and stretch over the notebook 100 without contacting the spine 114. For instance, the elastic band 128 may attach to the front and/or rear cover 104, 136 of the notebook 100 at a point 143 adjacent the spine 114 of the notebook 114 (e.g., as shown in FIGS. 1D and 1E).

Figure 1E:
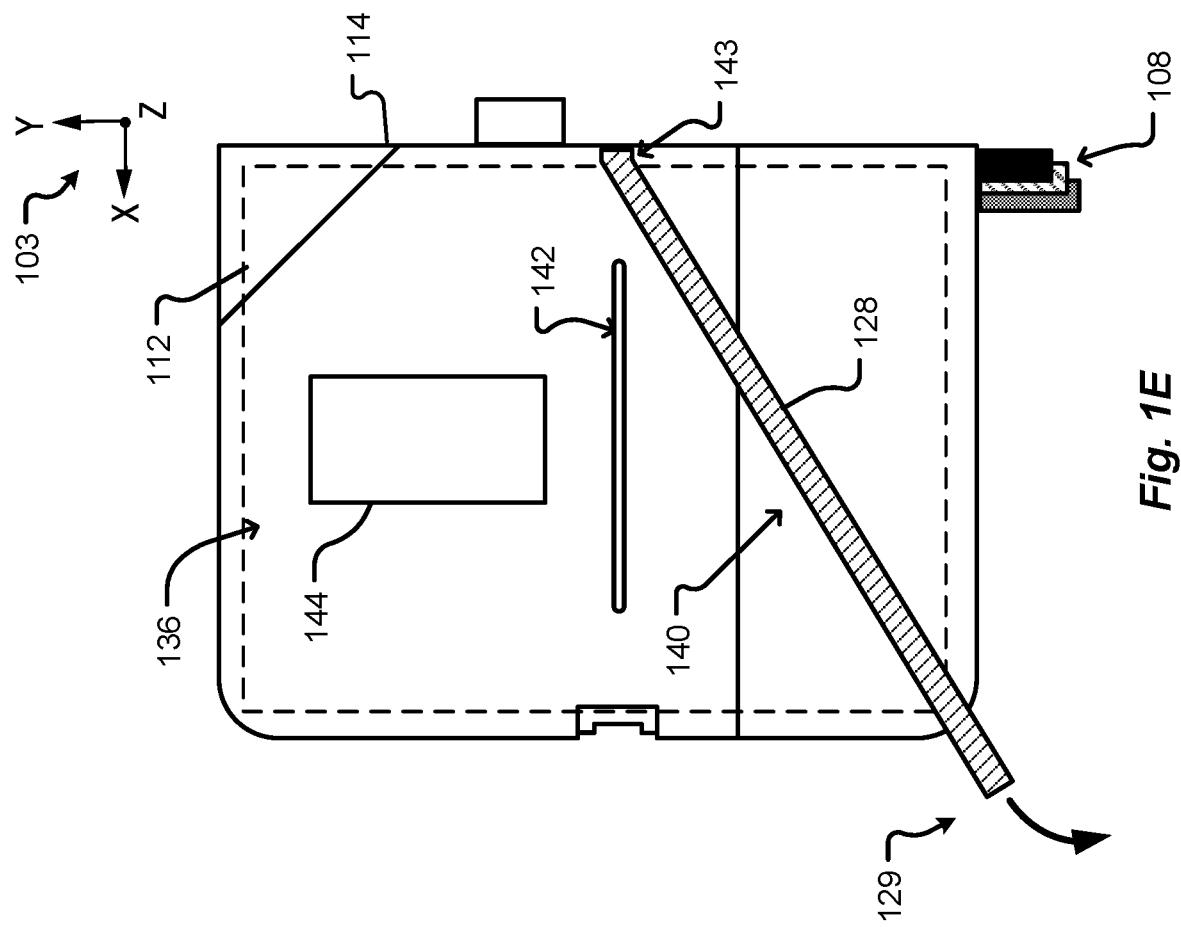
Figure 1D:
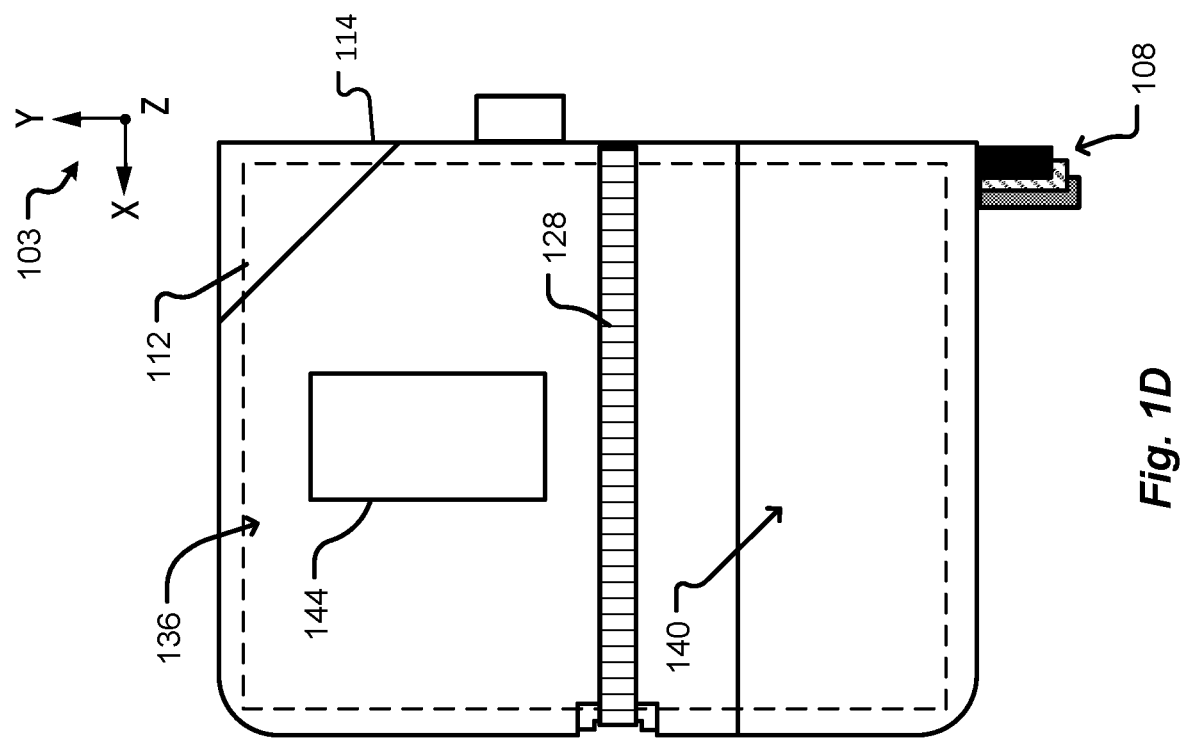
Figure 1F:
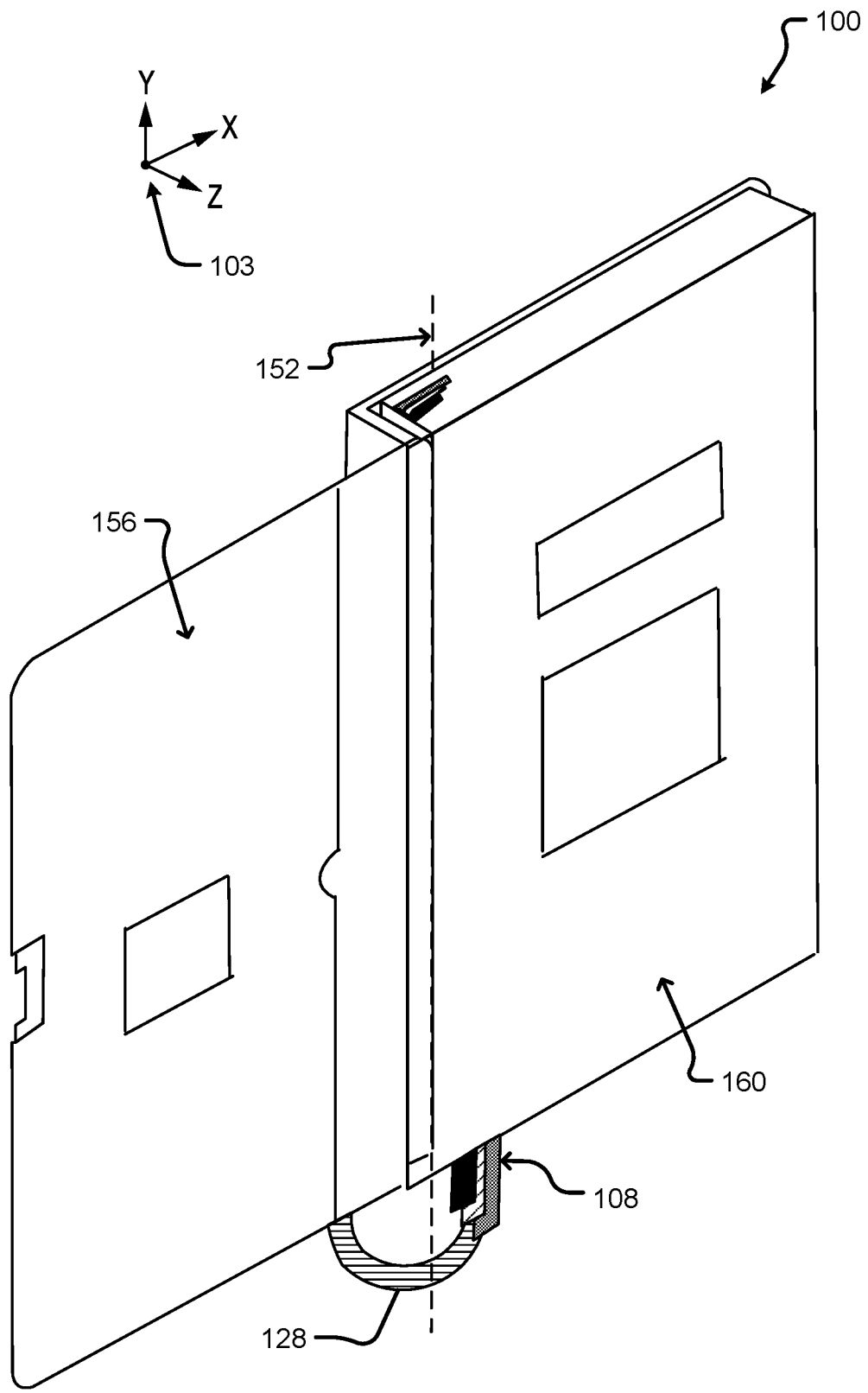
Figure 1G:
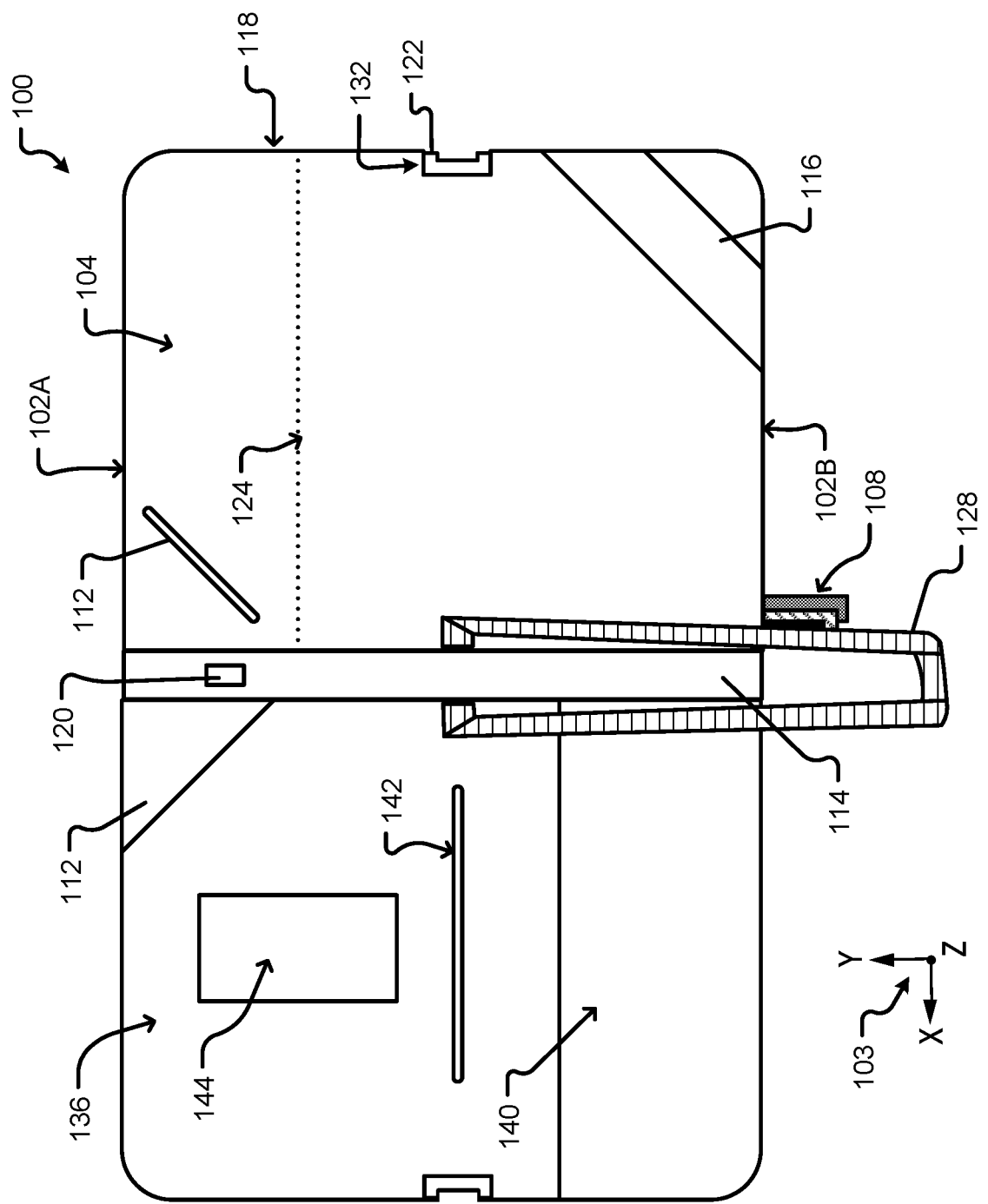

Referring to FIGS. 1D, 1E, and 1G, the rear cover 136 may comprise a corner storage flap 112, a rear pocket 140, an elastic band 144, and a hidden pocket 142. The rear cover 136 may offer stability or support to the notebook 100 by providing a second surface on which the plurality of pages may rest. Further, and as noted above, the rear cover 136 may interact with the elastic band 128, the front cover 104, and the spine 114 to keep the notebook 100 in a closed state (e.g., shut), such that the plurality of pages within the interior of the notebook 100 are protected. The elastic band 144 may permit storage of a large device (e.g., phone, tablet, computer, satellite notebook, etc.). In some embodiments, the elastic band 144 may be made of similar, if not the same material, as the corner storage flap 112 and/or the large storage flap 116. The elastic band 144 may be attached to the rear cover 136 in a variety of forms. For example, three sides of the elastic band 144 may be secured (e.g., sewn, stitched, glued, etc., and/or combinations thereof) to the rear cover 136, allowing the elastic band 144 to function as a pocket for storage purposes. In another example, the sides of the elastic band 144 closest to the top edge 102A and the bottom edge 102B, respectively, may be secured to the rear cover 136, such that the user may use the elastic band 144 as a carrying device or aid. In such an embodiment, the elastic band 144 may provide a place (e.g., a space) for a user of the notebook 100 to slide or insert their hand or at least a portion thereof. The elastic band 144 may provide the user with a comfortable, secure, and/or easy carrying experience for the notebook 100. In some embodiments, to further facilitate user experience, the elastic band 144 may be a strap (e.g., similar or identical to the strap associated with a large storage flap 116). The strap may allow the user to more easily carry the notebook 100 (e.g., permitting the user to carry the notebook 100 with only one hand).

The rear pocket 140 may span a part or all of the rear cover 136. The rear pocket 140 may be located on the bottom, in the middle, or at the top of the notebook 100. For instance, in one embodiment, the rear pocket 140 may cover an entirety of the bottom section of the notebook 100. The rear pocket 140 may provide a space, fold, or other pocket, for a user to place paper elements, electronics, and/or other objects. The rear pocket 140 may also be used for the storage of other elements or for attachments to other notebooks.

The hidden pocket 142 may provide further storage space in the notebook 100. The hidden pocket 142 may comprise a slot disposed on the surface of the rear cover 136 and a hidden portion extending under a portion of the rear cover 136 such that any element stored therein is not visible upon viewing the rear cover 136. The slot of the hidden pocket 142 may additionally or alternatively be hidden from view when the notebook 100 is in the closed state. For example, the hidden pocket 142 may be disposed beneath the elastic band 128 and not visible when the elastic band 128 is engaged with the front cover 104 and rear cover 136 to hold the notebook 100 together. The displacement of the elastic band 128 to a position 129, as shown in FIG. 1E, is moved from the normal closed position to reveal the hidden pocket 142 in the rear cover 136.

As previously noted, the notebook 100 may be configurable to move between the open state and the closed state. FIG. 1F illustrates the notebook 100 in an open state where the elastic band 128 is moved off the opening side 111 and movement of the front cover 104 relative to the rear cover 136 is unrestricted by the elastic band 128. In the open state, the notebook 100 may be opened such that the interior of the notebook 100 (e.g., a portion containing a plurality of pages) is accessible to a user. In transitioning from the closed state to the open state, the front cover 104 of the notebook may be pivoted about centerline 152 (e.g., a translation in the XZ-plane) such that the interior of the notebook is revealed to the user. Similarly, to transition from the open state to the closed state, the front cover 104 of the notebook may be pivoted about centerline 152 (e.g., a translation in the XZ-plane) such that the interior of the notebook is no longer revealed to the user.

As depicted in FIG. 1F, the pivoting of the front cover 104 may reveal a left open side 156 and a right open side 160 when the notebook 100 is in the open state. When the notebook 100 is in the open state, individual pages and/or groups of pages bound to the notebook 100 may be moved (e.g., by flipping) from the right open side 160 to the left open side 156 of the notebook 100, and/or vice versa. In one embodiment, the pages bound to the notebook 100 may be moved in a similar manner to the movement of the front cover 104 and/or the rear cover 136 as described in the transition of the notebook 100 between the open state and the closed state, and/or vice versa.

Although the plurality of ribbon markers 108, the corner storage flap 112, the large storage flap 116, the pen loop 120, the inset portion of material 122, the identifying design 124, the elastic band 128, the notched portion 132, the rear pocket 140, the hidden pocket 142, and the elastic band 144 are shown disposed on the notebook having a certain position, length, width, size, and/or shape, it should be appreciated, that alternative positions, lengths, widths, sizes, and/or shapes may be employed without sacrificing any functionality associated with at least the plurality of ribbon markers 108, the corner storage flap 112, the large storage flap 116, the pen loop 120, the inset portion of material 122, the identifying design 124, the elastic band 128, the notched portion 132, the rear pocket 140, the hidden pocket 142, and/or the elastic band 144 and, as such, other designs can produce the same, or similar, functional capabilities associated with the plurality of ribbon markers 108, the corner storage flap 112, the large storage flap 116, the pen loop 120, the inset portion of material 122, the identifying design 124, the elastic band 128, the notched portion 132, the rear pocket 140, the hidden pocket 142, and the elastic band 144.

Figure 2:
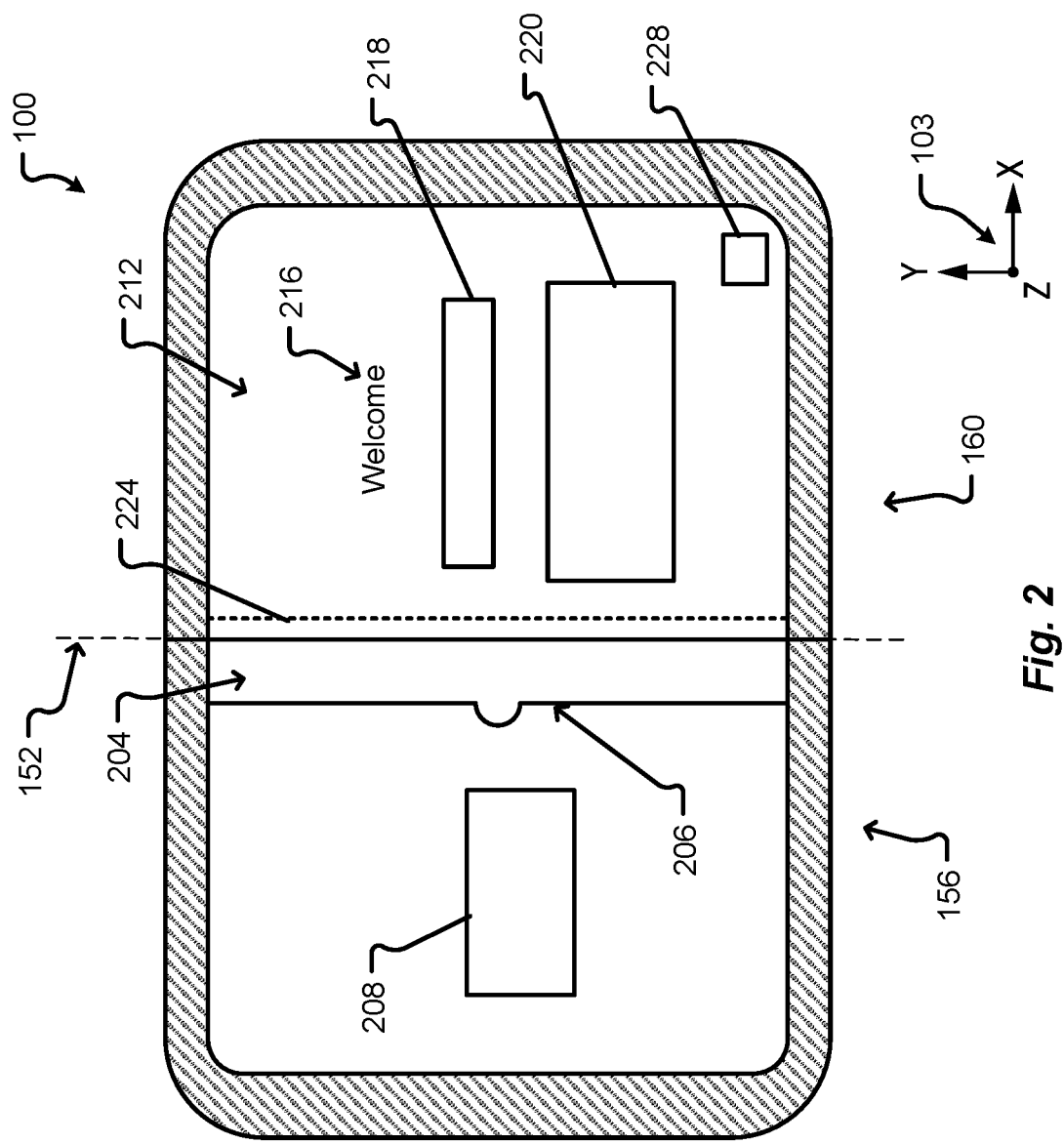
FIG. 2 shows a schematic view of an inside front cover and an introductory page of an opened notebook in accordance with embodiments of the present disclosure.

Referring to FIG. 2, an inside front cover 204 and an introductory page 212 of the notebook 100 are shown in accordance with embodiments of the present disclosure. The inside front cover 204 may provide a concealed pocket cover 206 and a pocket 208. The concealed pocket cover 206 may be a pocket or compartment used to store sensitive materials. In some embodiments, the concealed pocket cover 206 may contain a folding tab that allows the user to fold the flap and tuck it into a receptacle, providing extra security to the contents of the concealed pocket cover 206. The pocket 208 may be used to store the user's perforated papers that may have been removed from the notebook 100. In some embodiments, the pocket 208 may provide further storage for the user's other paper elements and/or may contain an additional slot for the storage of a writing instrument (not shown). In one embodiment, the pocket 208 may be configured to hold a notetaker's business card, credit card, phone, tablet, notecards, and/or the like. In some embodiments, the pocket 208 may be disposed on the inside front cover 204 of the notebook 100. The pocket 208 may be configured as a slit in the inside front cover 204 including a space to receive paper and/or some other object.

The introductory page 212 may provide the user with an introduction to the notebook and the note-taking guidance provided therein. The introductory page 212 may contain a greeting 216. The greeting 216 may greet the user in various ways. In some embodiments, the greeting 216 may be any language and may be any expression designed to greet and introduce the user to the notebook 100. In some embodiments, the introductory page 212 may contain a notebook information section 218. The notebook information section 218 may provide a space for the user to record information (e.g., name, email address, telephone number, physical address, etc.) in the event that the notebook is lost. In one embodiment, the notebook information section 218 may provide a space for the user to write their name, the date whereon they began use of the notebook 100, and/or the volume number of the notebook 100. In some embodiments, the introductory page 212 may correspond to the first page in a plurality of pages bound together forming the note-taking pages of the notebook 100.

In some embodiments, the introductory page 212 may comprise instructions 220. The instructions 220 may comprise information and/or helpful resources designed to assist the user in utilizing the notebook 100. In some embodiments the instructions 220 may contain instructions on how the pages are laid out, how to use the expert guidance, and where any reference tools may be found in the notebook 100. In some embodiments, the instructions 220 may take the form of a tool page, which may list the types of tools and references found therein that may be useful to the user.

The introductory page 212 may be perforated as indicated by a perforated edge 224. The perforated edge 224 may allow the user to remove the page from the plurality of pages bound together at the user's convenience or desire. In one embodiment, the perforated edge 224 appears on the introductory page 212, allowing the user to remove the introductory page at such a time determined by the user. In some embodiments, the introductory page 212 may not include a perforated edge 224. For instance, as the introductory page 212 may be used to identify the owner of the notebook 100, it may be beneficial to keep the introductory page 212 as an integral part of the notebook 100, which cannot be easily removed (e.g., without cutting or ripping from the notebook 100).

The introductory page 212 may include a page number 228. The page number 228 may provide an indexing of the number of pages in the notebook 100. The page number 228 may extend throughout some or all pages of the notebook 100. The page number 228 may be located on the introductory page 212 in any location (e.g., in the corners of the page, centered at the top and/or bottom of the page, offset from the corner of the page, etc.). The form and numbering format of the page number 228 is not particularly limited, and the notebook 100 may employ Arabic numerals (e.g., 1, 2, 3, etc.), Latin numerals (e.g., i, ii, iii, etc.), combinations thereof, and/or the like. In some embodiments, the page number 228 may begin count after the introductory page 212. In one embodiment, the page number 228 begins count on the introductory page 212.

Figure 3A:
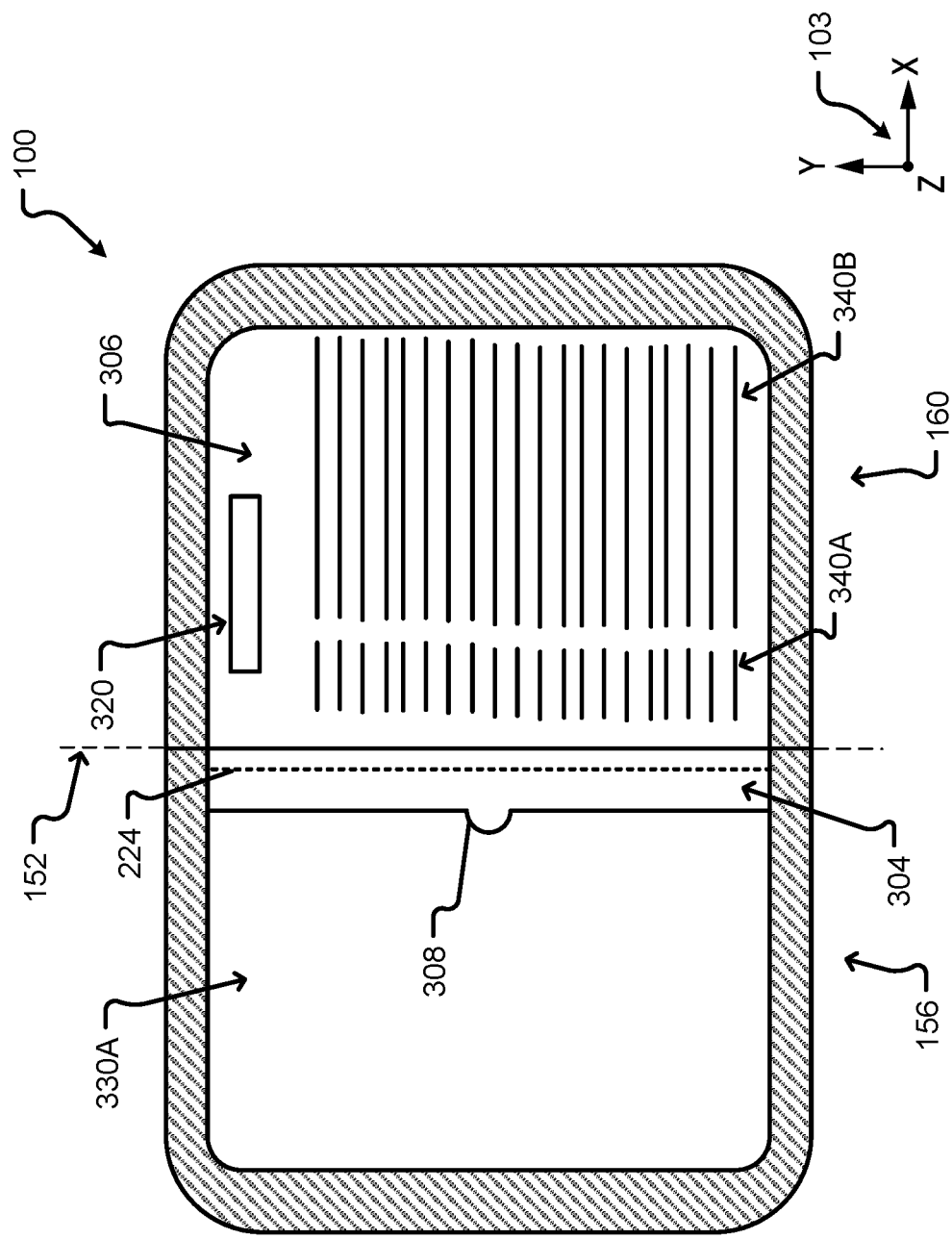
FIGS. 3A-3B show schematic views of an expert guidance page and an index page of the notebook in accordance with embodiments of the present disclosure.
Figure 3B:
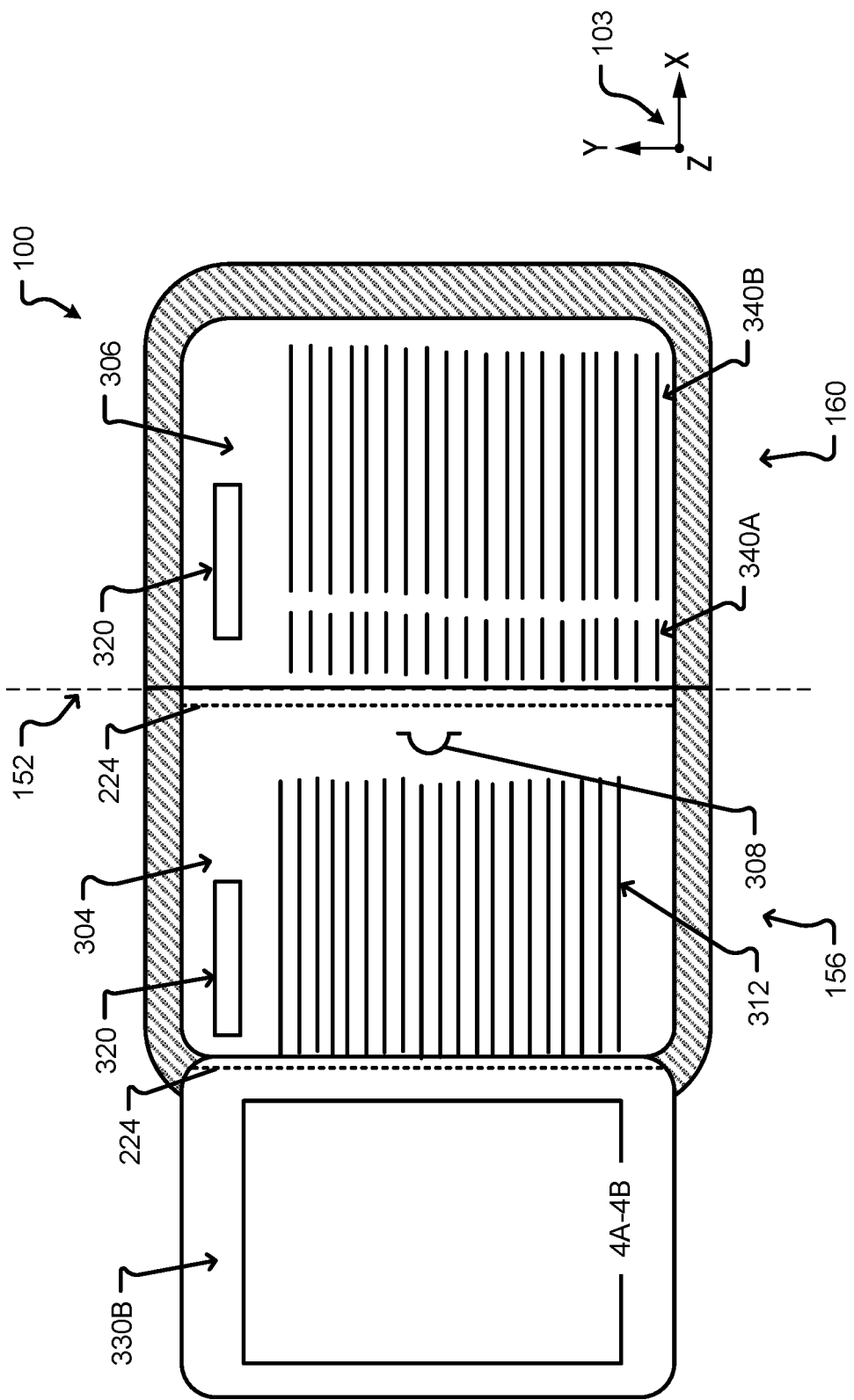

Referring now to FIGS. 3A-3B, the notebook 100 may include an index page 306 and at least one expert guidance page 330. In some embodiments, the index page 306 may follow the introductory page 212 in the plurality of pages of the notebook 100. For instance, the introductory page 212 may be moved from the right open side 160 to the left open side 156 of the notebook 100 to reveal the index page 306 on the left open side 156 and the at least one expert guidance page 330 on the right open side 160 of the notebook 100. In one embodiment, the index page 306 may be disposed on the right open side 160 and the at least one expert guidance page 330 may be disposed on the left open side 156 of the notebook 100. In any event, the index page 306 may provide a location for the user of the notebook 100 to construct a reference for each page of the notebook 100. The index page 306 may contain a header 320, which may provide guidance and information to the user on how to use the index page 306. The index page 306 may comprise a plurality of lines 340 spanning a portion or entirety of the index page 306. In some embodiments, the plurality of lines 340 may contain a one or more horizontal breaks (e.g., any line of the plurality of lines 340 may not be continuous along its entire span in the X-axis direction). The horizontal breaks may divide the plurality of lines 340 into a plurality of page number lines 340A and a plurality of descriptive lines 340B. The plurality of page number lines 340A may provide a location for the user to write in a page number of a page in the interior of the notebook 100, while the plurality of descriptive lines 340B may provide a location for the user to write in a description of the material to be found on the page number. In one embodiment, the plurality of descriptive lines 340B have a greater length (e.g., span in the X-axis direction) than the plurality of page number lines 340A.

The expert guidance page 330 may provide useful guidance and information to the user on how to use the notebook 100 and/or how to take notes in accordance with various note-taking methods/approaches. The expert guidance page 330 may be disposed in any location in the notebook 100, and is not limited to being disposed in proximity, or adjacent to, the index page 306. In one embodiment, the expert guidance page 330 may be at a single location in the notebook 100 (e.g., at the beginning, middle, end, etc.), and/or may appear at one or more spaced apart locations (e.g., at spaced intervals, or number of pages, etc.) throughout the notebook 100. In one embodiment, following the expert guidance page 330, the notebook 100 may include a series of notebook pages arranged according to one or more note-taking styles (e.g., described on the expert guidance page 330, etc.). The series, or plurality, of notebook pages may be configured in a variety of layouts with, among other things, lined, dotted, and/or blank writing areas to permit the user to implement the information provided by the expert guidance page 330.

The expert guidance page 330 may allow a user to refer to the content included thereon (e.g., regarding note-taking methods, tips, and/or approaches) while using the notebook 100. The expert guidance page 330 may be made from a more resilient material than paper (e.g., vellum, mylar, etc.), reinforced paper (e.g., laminated), etc. The greater resilience of the expert guidance page 330 may improve the longevity of the notebook 100 by reducing the chance of damage to the expert guidance page 330. In some embodiments, the expert guidance page 330 includes a perforated edge 224 that allows detachment of a portion or entirety of the expert guidance page 330 from the notebook 100.

In one embodiment, the expert guidance page 330 may include a fold-out page (e.g., bi-fold, tri-fold, etc.) from the notebook 100. The expert guidance page 330 may fold out from the notebook 100 in any number of ways. For example, the expert guidance page 330 may fold out toward the top of the page (e.g., extending from the top edge 102A of the notebook 100 outwardly from a center of the notebook 100, etc.). In another example, the expert guidance page 330 may fold out toward the left-hand side of the page (e.g., toward the left open side 156 when the notebook 100 is in the open configuration, or a periphery of the front cover 104 or rear cover 136 of the notebook 100). Among other things, these extensions of the expert guidance page 330 from the notebook 100 allow the user to continue writing, sketching, or otherwise taking notes, while being able to read, view, and/or refer to the expert guidance page 330. In some embodiments, the expert guidance page 330 may be seamlessly incorporated one or more pages in the interior of the notebook 100. For example, the expert guidance page 330 may be a watermark of a chart on one or more of the pages in the notebook 100, allowing the user to design a chart in accordance with the teachings of the expert guidance page 330.

In one embodiment, the expert guidance page 330 may fold out toward the left-hand side of the page from a closed (e.g., folded, etc.) position to an open (e.g., unfolded, etc.) position. While in the closed position, a first side 330A of the expert guidance page 330 may be visible to the user of the notebook 100, as depicted in FIG. 3A. The first side 330A of the expert guidance page 330 may contain expert guidance. In one embodiment, the first side 330A of the expert guidance page 330 may omit expert guidance, and may be similar in theme (e.g., color, pattern, shape) to the rest of the notebook 100, in order for a more aesthetically pleasing appearance.

In one embodiment, the expert guidance page 330 may be secured (e.g., prevented from folding out to the left-hand side of the notebook 100) by a tab 308. The tab 308 may rest on the first side 330A of the expert guidance page 330 and may keep the expert guidance page 330 from moving. In one embodiment, the tab 308 may be moved (e.g., pivoted about the Y-axis) to permit the expert guidance page 330 to fold out of the left-hand side of the notebook 100. In some embodiments, after the expert guidance page 330 has folded out, a second side 330B of the expert guidance page 330 may be visible to the user of the notebook 100 (see, e.g., FIG. 3B).

In some embodiments, the notebook 100 may include an objective page 304. The objective page 304 may comprise a header 320, which may provide information to the user on how to use the objective page 304. The objective page 304 may contain a plurality of lines 312. In some embodiments, the plurality of lines 312 may span a portion or the entirety of the objective page 304. The plurality of lines 312 may be used, for example, by the user to construct a list of objectives (e.g., for what purpose the user wishes to use the notebook 100, what note-taking strategies the user wishes to implement, what the user wishes to accomplish by using the notebook 100, etc.). In one embodiment, the objective page 304 includes a perforated edge 224 to permit the detachment of the objective page 304 from the notebook 100.

Following the expert guidance page 330, the notebook 100 may include a number of note-taking pages. These pages may be configured in a variety of formats (e.g., as depicted in FIGS. 5-8). In some embodiments, the pages may include tips/reminders disposed throughout a section and/or number of pages in the notebook 100. In one embodiment, the tips/reminders may be disposed in the first 10 pages, or so, of the notebook 100.

Figure 4A:
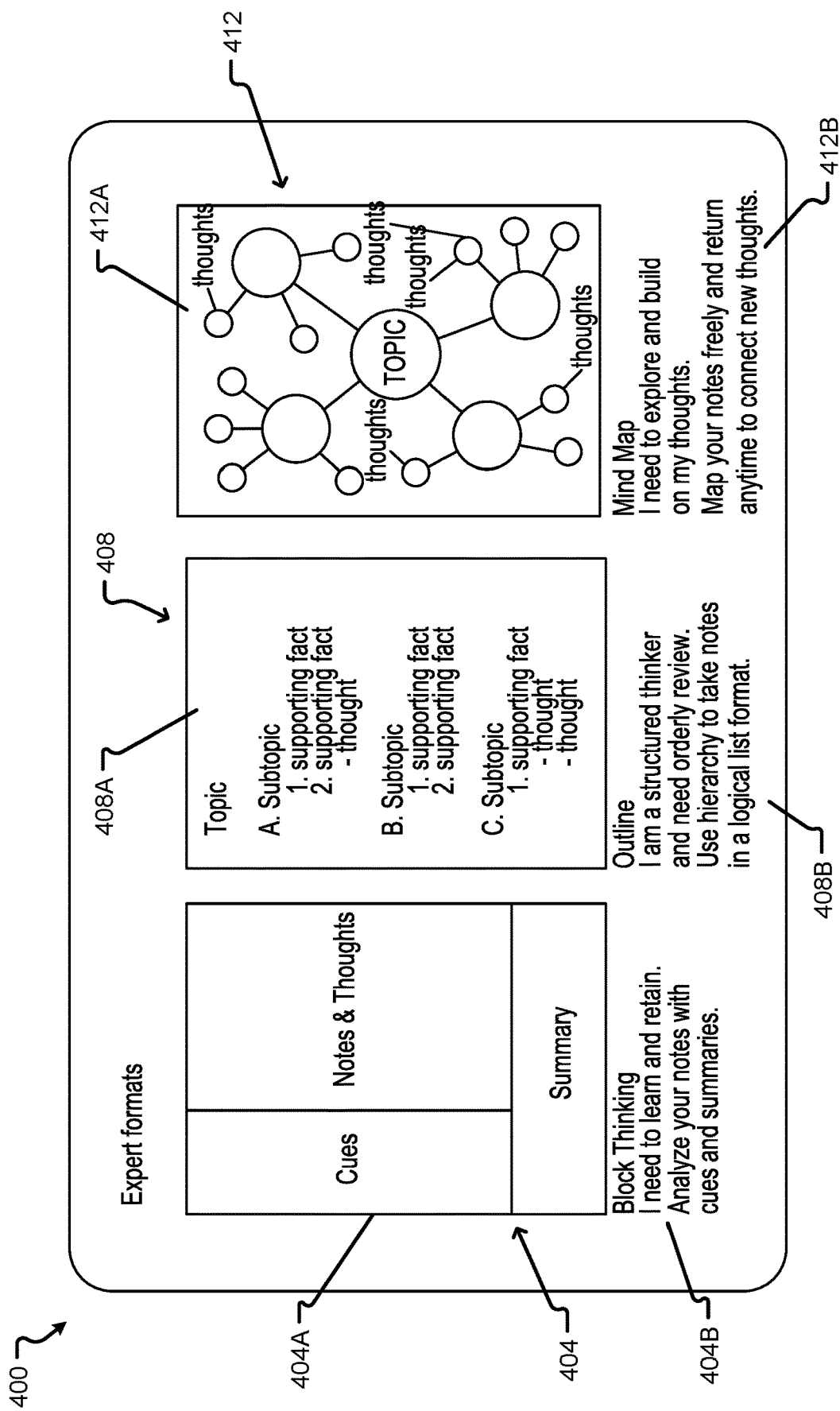
FIGS. 4A-4C show schematic views of various expert formats of the expert guidance page in accordance with embodiments of the present disclosure.
Figure 4B:
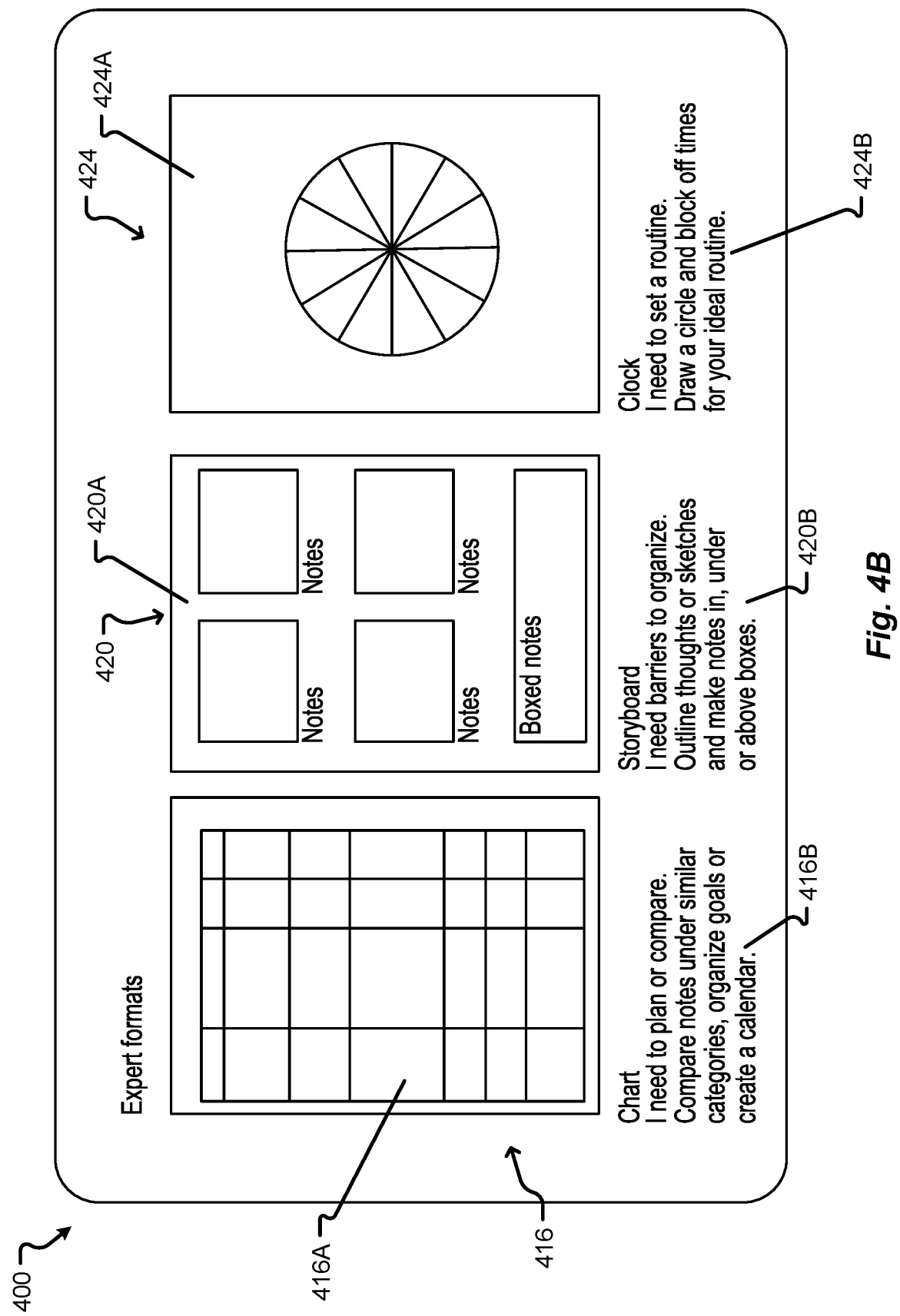

FIGS. 4A-4B show schematic views of content 400 provided by the expert guidance page 330 in accordance with embodiments of the present disclosure. The expert guidance page 330 may include one or more forms of the content 400. In other words, the expert guidance page 330 may provide more than one instructional figure and/or guidance in the form of content 400. The content 400 may include one or more expert note-taking formats (e.g., methods, layouts, styles, etc.). The content 400 may include, but is no way limited to, written information, images, and/or pictures on note-taking styles, mind maps, outlines, charts, storyboards, and sketches to name a few. In some embodiments, the content 400 may include instructional figures (e.g., instructional FIGS. 404A-424A) and/or guidance (e.g., guidance 404B-424B) to assist the user in note-taking using a variety of methods/approaches. The content 400 may provide a form of guidance, a diagram, a picture, and/or a written tip to assist the user in note-taking (e.g., according to a particular method, approach, notebook type, format, etc.).

The content 400 may include block thinking instructions 404. The block thinking instructions 404 may teach the user to implement cues and summaries in conjunction with notes and/or thoughts to better assist in learning and retaining information. The block thinking instructions 404 may include a block thinking instructional FIG. 404A, which illustrates an example structure using block thinking (e.g., a cue section, a notes and thoughts section, a summary section, etc., combinations thereof, and/or the like), as well as a block thinking guidance 404B, which instructs the user on possible scenarios where implementing block thinking may be useful (e.g., when a user needs to learn and retain information). The content 400 may additionally or alternatively include outline instructions 408. The outline instructions 408 may assist the user in creating an outline (e.g., a hierarchical structure, a bulleted list, a linear list containing notes, etc.). In one embodiment, the outline instructions 408 may teach the user to implement structures containing, for example, a topic, subtopics, and additional notes on each sub topic in a listed manner. The outline instructions 408 may include an outline instructional FIG. 408A that may show an example format an outline may take (e.g., a topic, one or more subtopics, and one or more supporting facts, thoughts, and/or combinations thereof for teach subtopic). The outline instructions 408 may additionally or alternatively include an outline guidance 408B which may describe when and/or how an outline may be useful (e.g., an outline hierarchical structure may assist in structured thought and orderly review).

The content 400 may include mind map instructions 412 as illustrated in FIG. 4A. The mind map instructions 412 may instruct the user on how to use a mind map (e.g., a plurality of structures containing concepts with lines drawn therebetween to connect ideas or concepts to one another). The mind map instructions 412 may include a mind map instructional FIG. 412A to illustrate an example layout of a mind map (e.g., a plurality of circles containing words representative of ideas or concepts, with lines drawn between different circles to indicate different connections between the words). The mind map instructions may comprise a mind map guidance 412B, which may indicate when a mind map may be helpful (e.g., mind maps may be useful in exploring and building thoughts). As shown in FIG. 4B, the content 400 may contain chart instructions 416. The chart instructions 416 may provide guidance on how to use a chart (e.g., a table, a plurality of vertical and horizontal lines orthogonally intersecting one another to form a variously sized cells, etc.). For instance, the chart instructions 416 may comprise a chart instructional FIG. 416A, which may illustrate an example chart layout (e.g., a plurality of columns and rows, the cells of which the user may write and/or sketch concepts), and/or chart guidance 416B, which may recommend to the user best practices when using the chart (e.g., charts are helpful when planning and/or comparing is required, charts allow notes under similar categories to be compared, charts can help organize goals, charts may be used in the creation of a calendar, etc., and/or combinations thereof).

The content 400 may include storyboard instructions 420 as illustrated in FIG. 4B. The storyboard instructions may instruct the user how to use a storyboard (e.g., a plurality of boxes organized in spatial and/or temporal relation). The storyboard instructions 420 may comprise a storyboard instructional FIG. 420A. The storyboard instructional FIG. 420A may show an example storyboard (e.g., a plurality of boxes for note-taking, with an additional box for sketching and/or writing a summary, etc.). The storyboard instructions 420 may additionally or alternatively comprise storyboard guidance 420B. The storyboard guidance 420B may include tips and/or guidance as to when a storyboard may prove effective in meeting the user's requirements for note-taking (e.g., storyboards may help in outlining thoughts or sketches, storyboards assist in providing structural boundaries for organizing information, thoughts may be placed in, under, and/or above boxes, etc., and/or combinations thereof). The content 400 may include clock chart instructions 424 as shown in FIG. 4B. The clock chart instructions 424 may instruct the user on how to use a clock chart, or graphic, (e.g., a circular structure divided into sections) to layout events in a clock-based graphical format. The clock chart instructions 424 may comprise a clock chart instructional FIG. 424A. The clock chart instruction FIG. 424A may illustrate an example segmented clock chart (e.g., a circle divided into multiple uniform sections). The clock chart instructions 424 may additionally or alternatively comprise clock chart guidance 424B. The clock chart guidance 424B may provide details to assist the user on when to use a clock chart (e.g., a clock chart may be beneficial in setting a routine, a clock chart may be divided into sections with each section containing an ideal routine event associated with a particular time or relative time position in a clockwise fashion, etc., and/or combinations thereof).

Figure 4C:
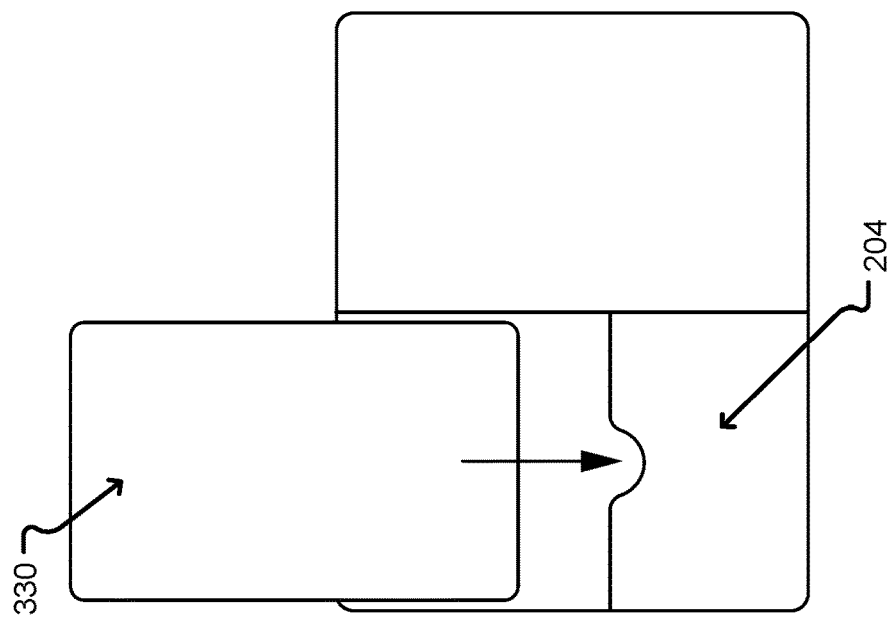
Figure 4C:
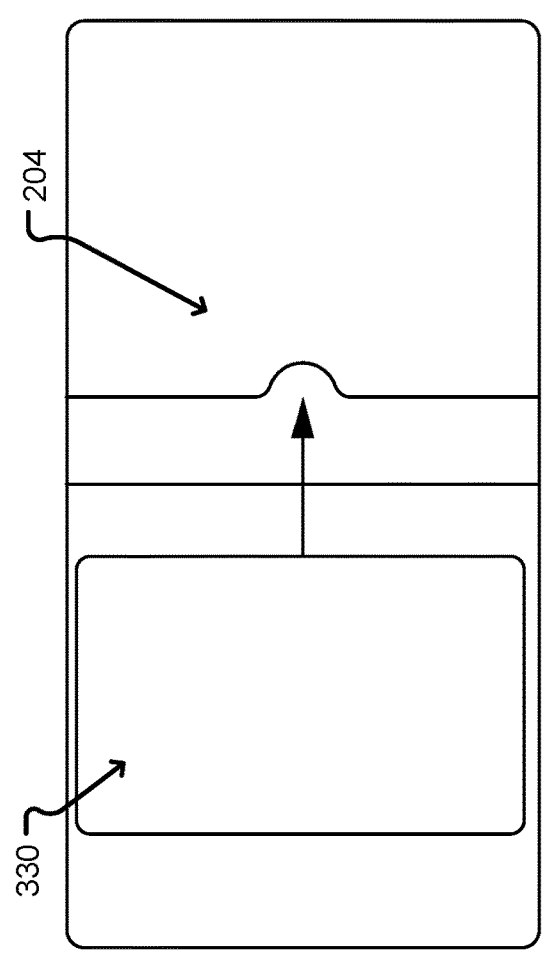

In some embodiments, the expert guidance page 330 may be a separate sheet or paper (e.g., a notecard, an insert, etc.) that is capable of being inserted into a receiving pocket in a notebook 100. In one embodiment, the expert guidance page 330 may be separated from the plurality of pages in the notebook 100 and then form the separate sheet or paper. In some embodiments, and as depicted in FIG. 4C, the expert guidance page 330 may be configured to be inserted into the front inside cover 204 of the notebook 100. The receiving pocket is not limited to the front inside cover 204, and any pocket mentioned herein may be configured to receive the expert guidance page 330.

Figure 5:
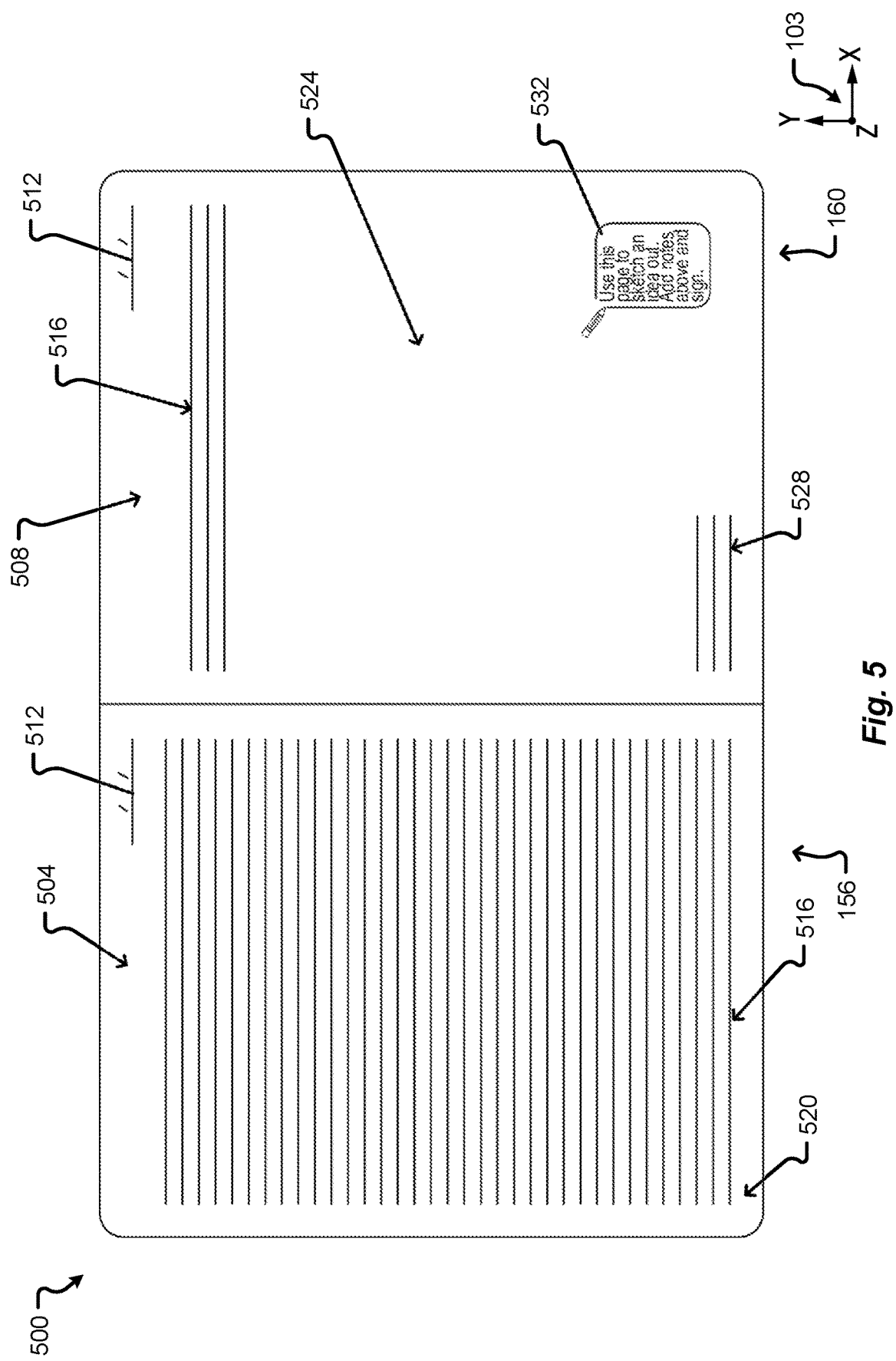
FIGS. 5-8 show various views of page layouts of the notebook including expert formats in accordance with embodiments of the present disclosure

Referring now to FIG. 5, a note-taking page layout 500 is shown in accordance with embodiments of the present disclosure. The note-taking page layout 500 may comprise a lined page 504 and a sketch page 508. The lined page 504 may comprise a date section 512, a plurality of lines 516, and a page number 520. The date section 512 may allow the user to write a date associated with the page (e.g., the date the user began and/or finished using the page). The date section 512 may allow the user to provide any form of the date (e.g., month (mm) day (dd), year (yyyy); mm/dd/yyyy; dd/mm/yyyy; yyyy-mm-dd; yyyy mm dd; mm.dd.yyyy, etc.). In some embodiments, the date section 512 may include a formation to guide the user in writing the date. Examples of the formation of the date section 512 include, but are in no way limited to, a grid structure that allows the user to write the horizontally or vertically, a line containing formatted forward slashes allowing the user to quickly fill in the date, combinations thereof and/or any other format style. The plurality of lines 516 may extend along a portion or entirety of length and/or height (e.g., in the X-axis and/or the Y-axis direction) of the lined page 504 and may provide space for the user to take notes (e.g., write). The plurality of lines 516 may span all or part of the lined page 504. In some embodiments, the plurality of lines 516 may comprise various line styles (e.g., solid, dashed, dotted, etc.). The page number 520 may be similar, if not identical, to the page number 228. For example, the page number 520 may follow the number scheme of the page number 228, and, when the page number 520 is positioned after the page number 228 in the notebook 100, may have a larger (e.g., later) number than the page number 228. Although shown on the left open side 156 of the notebook 100, the lined page 504 may be disposed on the right open side 160 of the notebook 100.

The sketch page 508 may comprise the date section 512, the plurality of lines 516, a sketch area 524, one or more truncated lines 528, and instructions 532. The sketch area 524 may provide a location where the user may sketch out images, pictures, or ideas. In some embodiments, the sketch area 524 may be unlined. In other words, the sketch area 524 may simply provide a blank space devoid of lines. The sketch area 524 is in no way limited to drawings or figures, and in some embodiments may be used to organize thoughts and ideas. In some embodiments, the sketch area 524 may make up a portion or all of the sketch page 508. In one embodiment, the sketch area 524 makes up a portion of the sketch page 508. The one or more truncated lines 528 may span only a portion of the sketch page 508. In some embodiments, the one or more truncated lines 528 may provide a space for the user to take notes related to the sketch area 524. For example, the one or more truncated lines 528 may be used by the user to describe a sketch in the sketch area 524, note what should be sketched in the sketch area 524, or the like. In one embodiment, the one or more truncated lines 528 may be used by the user to sign and date the page after the sketch area 524 and/or the sketch page 508 has been used to the satisfaction of the user. Although shown on the right open side 160 of the notebook 100, the sketch page 508 may be disposed on the left open side 156 of the notebook 100.

The instructions 532 may provide guidance, tips, reminders, and/or the like in assisting the user to use the sketch page 508. For instance, the instructions 532 may provide the user with any form of the content 400 to guide the user in using the sketch area 524. In some embodiments, the instructions 532 may take the form of a watermark that assists the user in designing, sketching, writing, or the like in accordance with the teachings of the expert guidance page 330. For example, the instructions 532 may remind the user on how to construct a mind map, a chart, a pie chart, a sketch, and/or combinations thereof. In some embodiments, the instructions 532 may be various forms of the content 400 (e.g., mind map guidance 412B, etc.). The instructions may be located on any position on the sketch page 508 (e.g., in the corners, centered on the top and/or bottom, etc.) to better assist the user in performing note-taking in accordance with the expert guidance sheet 330.

Figure 6:
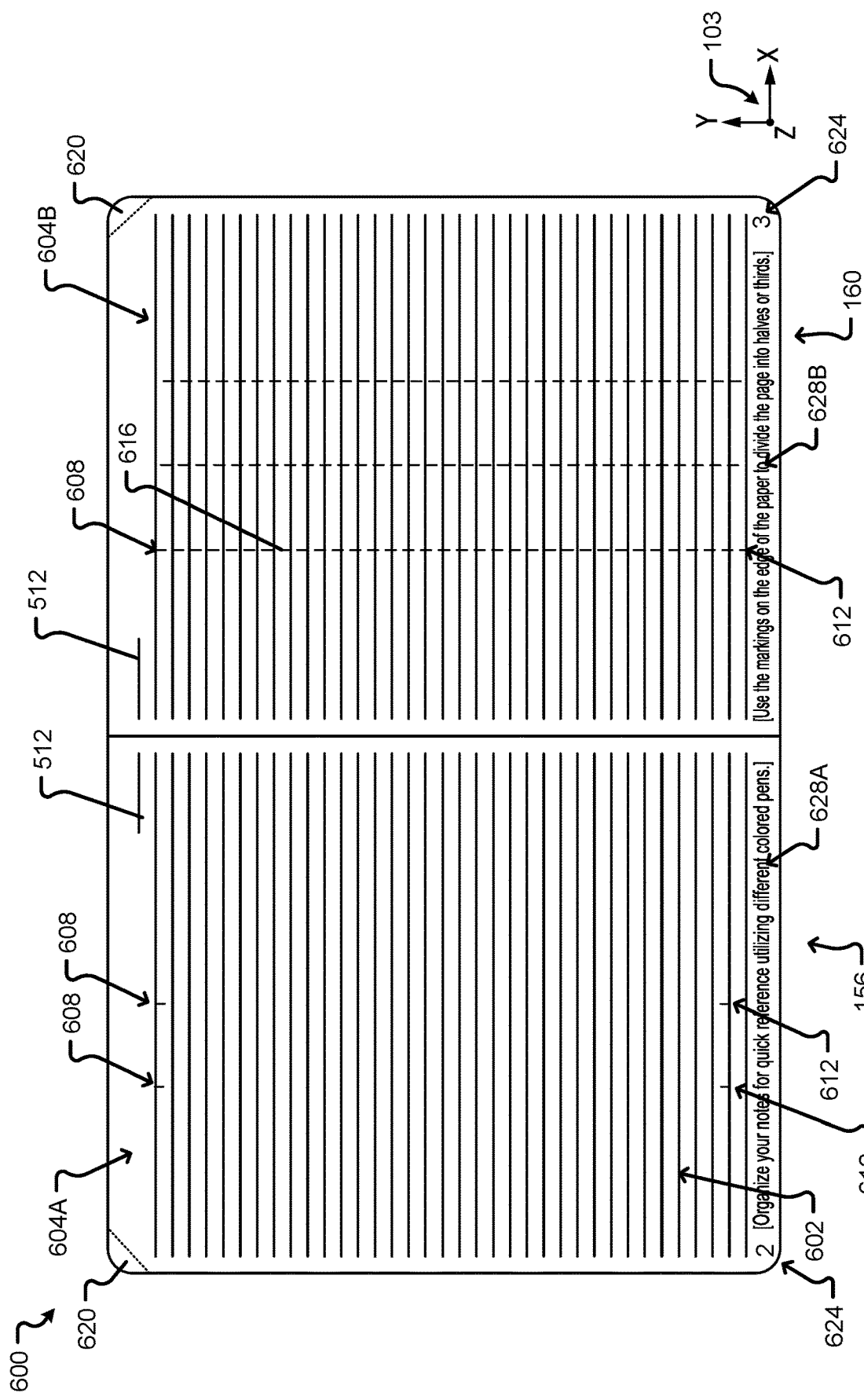

Turning to FIG. 6, a note-taking page layout 600 is shown in accordance with embodiments of the present disclosure. The note-taking page layout 600 may comprise a lined page 604A. As illustrated in FIG. 6, the lined page 604A may comprise a date section 512, a plurality of lines 602, and a page number 624. The date section 512 may be similar to, if not the same as, the date section 512 previously described with reference to the note-taking page layout 500. The page number 624 may be similar to, or the same as, the page number 520 previously described with reference to the note-taking page layout 500. In embodiments where the lined page 604A immediately follows the sketch page 508 in the notebook 100, the page number 624 may continue a numbering sequence (e.g., numbering format, type, sequence, etc.) from the page number 520.

The plurality of lines 602 may extend along a portion or entirety of the line page 604 and may provide space for the user to take notes (e.g., write, scribble, draw, etc.). The plurality of lines 602 may span all or part of the lined page 604A. In some embodiments, the plurality of lines 602 may comprise various line styles (e.g., solid, dashed, dotted, etc.). The plurality of lines 602 may comprise upper vertical tallies 608 and lower vertical tallies 612. The tallies (e.g., marks, dashes, lines, tick marks, etc.) may begin on any one of the lines of the plurality of lines 602 and may extend therefrom in an orthogonal (e.g. perpendicular, at 90 degrees, etc.) direction. For instance, and as depicted in FIG. 6, the plurality of lines 602 may extend along the X-axis direction and upper vertical tallies 608 may attach to one of the plurality of lines 602 and extend in the Y-axis direction (e.g., in a direction orthogonal to the extension of the plurality of lines 602). The upper vertical tallies 608 may partially extend from the bottom of one or more of the lines 602, while the lower vertical tallies 612 may partially extend from the top of one or more of the lines 602. In some embodiments, the upper vertical tallies 608 and lower vertical tallies 612 may visibly subtle relative to the plurality of lines 602. For instance, the upper vertical tallies 608 and lower vertical tallies 612 may be printed in a lighter color than the plurality of lines 602, may be thinner in width than the plurality of lines 602, may extend only through a portion of spaces between the plurality of lines 602 (e.g., 25% of the space therebetween), and/or combinations thereof to avoid visual clutter on the lined page 604A.

In one embodiment, the upper vertical tallies 608 may extend vertically downward (e.g., along the negative Y-axis direction) only from the topmost line of the plurality of lines 602 and the lower vertical tallies 612 may extend vertically upward (e.g., along the Y-axis direction) only from the bottommost line of the plurality of lines 602. In such an embodiment, the upper vertical tallies 608 and the lower vertical tallies 612 may respectively align with one another (e.g., vertically, in the Y-axis direction, etc.). In some embodiments, the alignment of the upper vertical tallies 608 and the lower vertical tallies 612 may assist the user in drawing or filling in a page dividing marking 616. The page dividing marking 616 may divide the lined page 604A into multiple sections, allowing the user to better organize the lined page 604A.

The note-taking page layout 600 may include a formatted page 604B. The formatted page 604B may be similar to the lined page 604A and may include one or more page dividing markings 616. The page dividing markings 616 may visually separate the formatted page 604B into sections, allowing a user to more easily organize the formatted page 604B. In one embodiment, the page dividing markings 616 may allow a user to use the formatted page 604B in a manner consistent with a block thinking (e.g., the Cornell style, etc.) form of note-taking. In some embodiments, the page dividing markings 616 may be pre-printed on the formatted page 604B.

The lined page 604A and/or the formatted page 604B may make use of a tab bookmark 620. The tab bookmark 620 may fold down to allow the user to quickly relocate pages in the notebook 100. The tab bookmark 620 may be found anywhere on any of the pages associated with the note-taking page layout 600 (e.g., lined page 640A, formatted page 604B, and/or combinations thereof). For example, the tab bookmark 620 may be located on the side of the lined page 604A, at the top of the lined page 604A, or elsewhere on the lined page 604A. In some embodiments, the tab bookmark 620 may be found on every page in the notebook 100. In one embodiment, the tab bookmark 620 may be located in the corner of any page and may fold down onto and remain on the surface of the current page (e.g., lined page 604A) in the notebook 100. The tab bookmark 620 may contain a perforated or scored edge to allow the user to bend and/or remove the tab bookmark 620.

The note-taking page layout 600 may include a footer 628A or 628B. The footer 628A may contain information beneficial to the user in utilizing the notebook 100. In some embodiments, the footer 628A may contain tips for using the notebook 100. In one embodiment, the footer 628A may include reminders on how to best utilize the expert guidance page 330 and/or the various sections/page layouts of the notebook 100. The footer 628A may provide different information than the footer 628B. For instance, the footer 628A may be directed toward a tip for using the notebook 100, while the footer 628B may be a reminder on how to use the expert guidance page 330. The information displayed by the footers 628A, 628B is not limited, and may include tips, reminders, guidance, and/or combinations thereof directed toward using block thinking (e.g., the Cornell method, etc.), outlining, mind mapping, charting, storyboarding, and/or sketching.

Figure 7:
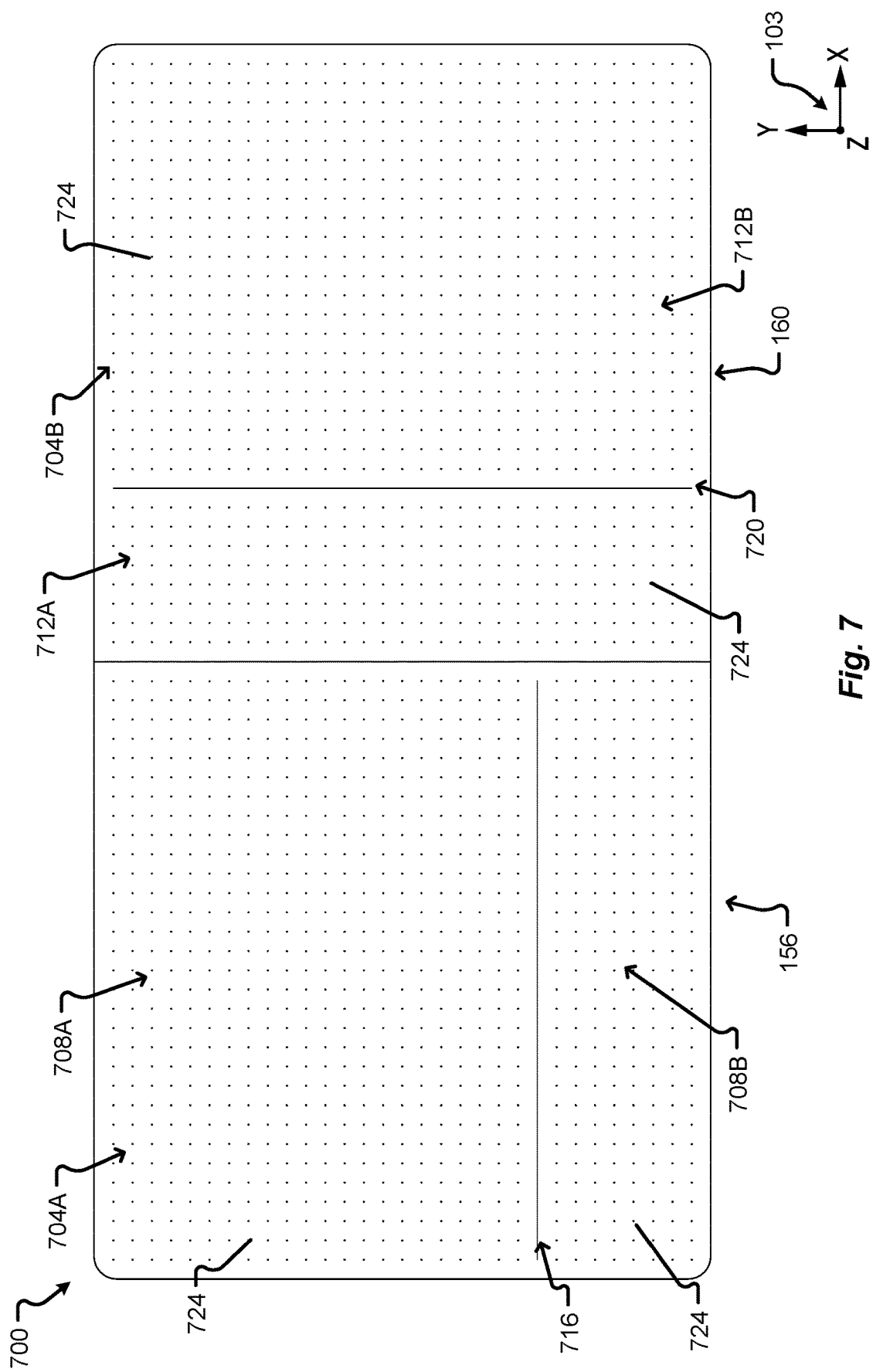

FIG. 7 shows an example of another note-taking page layout 700 of the notebook 100 in accordance with embodiments of the present disclosure. The note-taking page layout 700 may be used alone or in combination with any other page layout forming the plurality of pages of the notebook 100 described herein. The note-taking page layout 700 may comprise one or more pages including dotted pages 704A, 704B. The dotted pages 704A, 704B may provide the user with an array of dots 724 to assist in note-taking. For instance, the user may use the array of dots 724 to better utilize expert note-taking techniques (e.g., sketching, graphing, Cornell note-taking method, etc.). In one embodiment, the array of dots 724 may contain dots that are evenly (e.g., uniformly) spaced apart along both the X-axis and Y-axis directions. That is, each dot in the array of dots 724 may be spaced the same distance from surrounding dots along a portion or entirely of the dotted pages 704A, 704B. Alternatively, the array of dots 724 may be distributed in clusters, such that only certain portions of the dotted pages 704A, 704B contain the majority of the dots of the array of dots 724.

In some embodiments, the dotted page 704A may include a horizontal line 716 extending partially or entirely through the dotted page 704A (e.g., in the X-axis direction), which may separate the dotted page 704A into an upper section 708A and a lower section 708B. The separation of the dotted page 704A may assist the user in organizing the dotted page 704A. For instance, the user may choose to use the upper section 708A to implement a first note-taking style (e.g., a sketch), and may then use the lower section 708B to write about the first note-taking style (e.g., a description of a sketch, a reflection of the user's thoughts on using the note-taking style, notes on how well the first note-taking style works for the user, etc.). In some embodiments, the upper section 708A and the lower section 708B may encompass different areas of the dotted page 704A (e.g., the upper section 708A covers more area than the lower section 708B, the upper section 708A covers less area than the lower section 708B, the upper section 708A and the lower section 708B each cover half the dotted page 704A, etc.). In some embodiments, the array of dots 724 may extend only partially through the dotted page 704A (e.g., the array of dots 724 only covers a portion of the upper section 708A and/or the lower section 708B; the array of dots 724 is only present in one of the upper section 708A and the lower section 708B, and absent in the other; etc.). In such embodiments, the dotted page 708A may be a partially-blank and partially-dotted configuration. This configuration, among other things, allows for a combination of sketching and written note-taking. The dotted page 704B may be similar to the dotted page 704A and may contain a vertical line 720 extending partially or entirely through the dotted page 704B (e.g., in the Y-axis direction). The vertical line 720 may divide the dotted page 704B into a left section 712A and a right section 712B. In some embodiments, the dotted page 704B may be a mirrored and/or rotated version of the dotted page 704B. In one embodiment, the dotted page 704B may display similar features to the dotted page 704A, with certain features on the page rotated (e.g., by 90 degrees clockwise, or 90 degrees counterclockwise, in the XY-plane).

Figure 8:
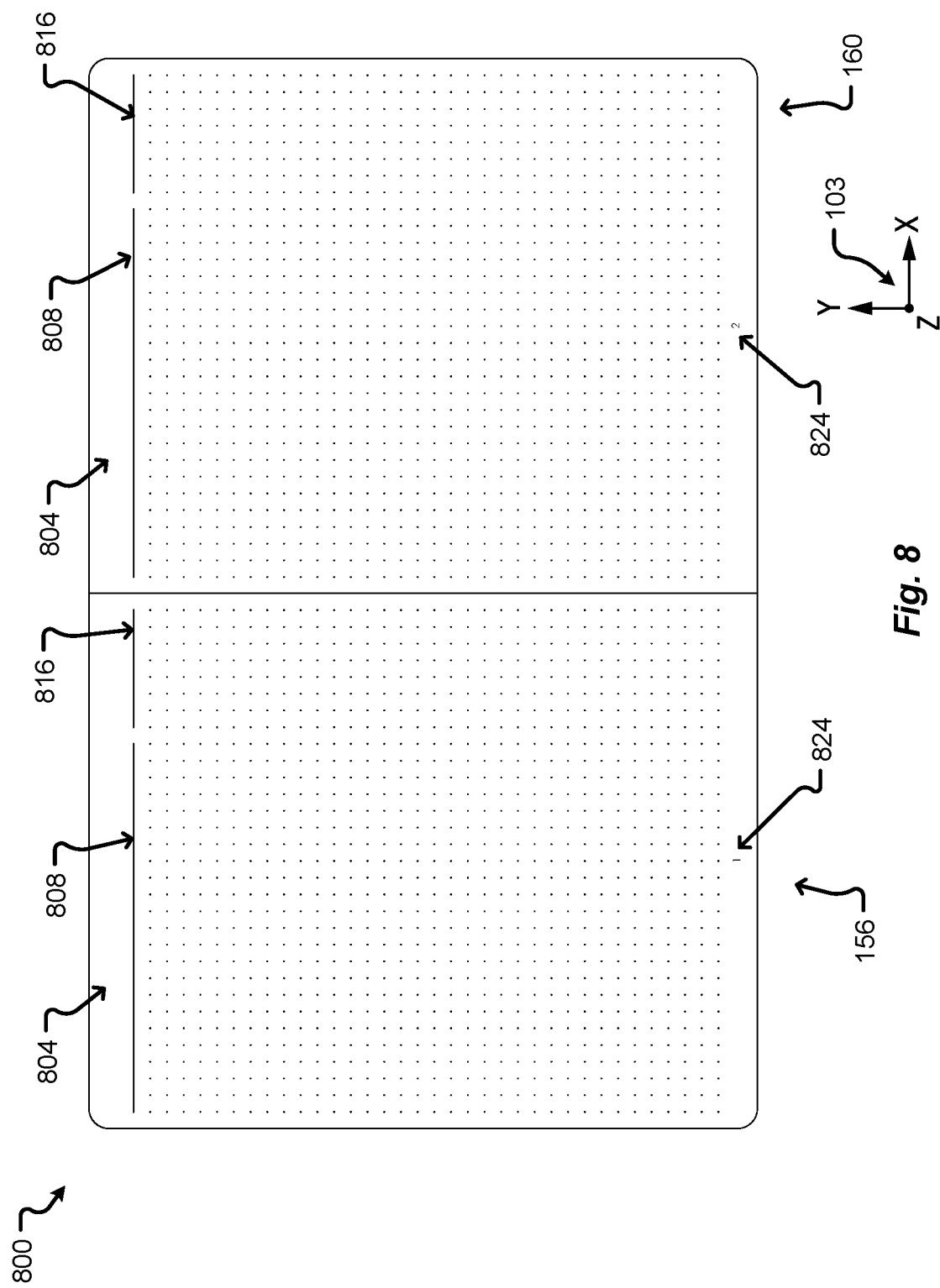

A note-taking layout 800 detailing a note-taking page 804 is shown in FIG. 8 in accordance with embodiments of the present disclosure. The note-taking page layout 800 may be used alone or in combination with any other page layout forming the plurality of pages of the notebook 100 described herein. The note-taking page 804 may contain a header 808, a date section 816, an array of dots 820, and a page number 824. The header 808 may be a space where the user may write a title for their work. In one embodiment, the header 808 provides a blank space and a horizontal line below the blank space, which may assist the user in writing the title. The date section 816 may provide a location for the user to notate the date associated with the note-taking page 804 (e.g., the date the user began using the note-taking page 804, the date the user finished using the note-taking page 804, etc.). The date section 816 may be similar to or the same as any previously described date section (e.g., date section 512). The page number 824 may be similar to or the same as any previously described page number (e.g., page number 624).

The array of dots 820 may be distributed along a portion of the note-taking page 804. The array of dots 820 may assist the user in implementing the expert note-taking techniques described herein. The array of dots 820 may be similar, if not identical, to the array of dots 724. In some embodiments, the array of dots 820 may extend into the header 808, which may assist the user in filling out the header 808.

Any one or more of the note-taking page layouts 500, 600, 700, and/or 800 may include or implement features from any one of the other note-taking layouts. In other words, any one or more of the note-taking layouts may implement some or all of the features previously mentioned, including, but in no way limited to, a header, a footer, a page number, a date section, a sketch section, a signature block, a tab bookmark, a perforated edge, a plurality of lines, an array of dots, combinations thereof, or the like. Any one or more of the note-taking layouts may implement additional or alternative content including, but not limited to, sketch pages, gridded paper for calendars, storyboards, and other gridded thoughts, dotted pages for free sketching and note-taking, formatting for lists, recommendation and reminder pages, expert guidance tips, combinations thereof, and/or any other page content previously described.

In some embodiments, the any one or more of the note-taking page layouts 500, 600, 700, and/or 800 may be implemented on various notebook pages and/or sections. For instance, a first section of the notebook 100 may contain 4 pages containing one of each of the note-taking page layouts 500, 600, 700, and/or 800. Subsequent sections may then be repeats of the first section such that each section of the notebook 100 contains at least one note-taking page layout described herein. Any combination of page numbers in any page order is possible for each section of pages within the notebook 100. In some embodiments, each section of the notebook 100 is separated by an expert guidance page 330.

Figure 9:
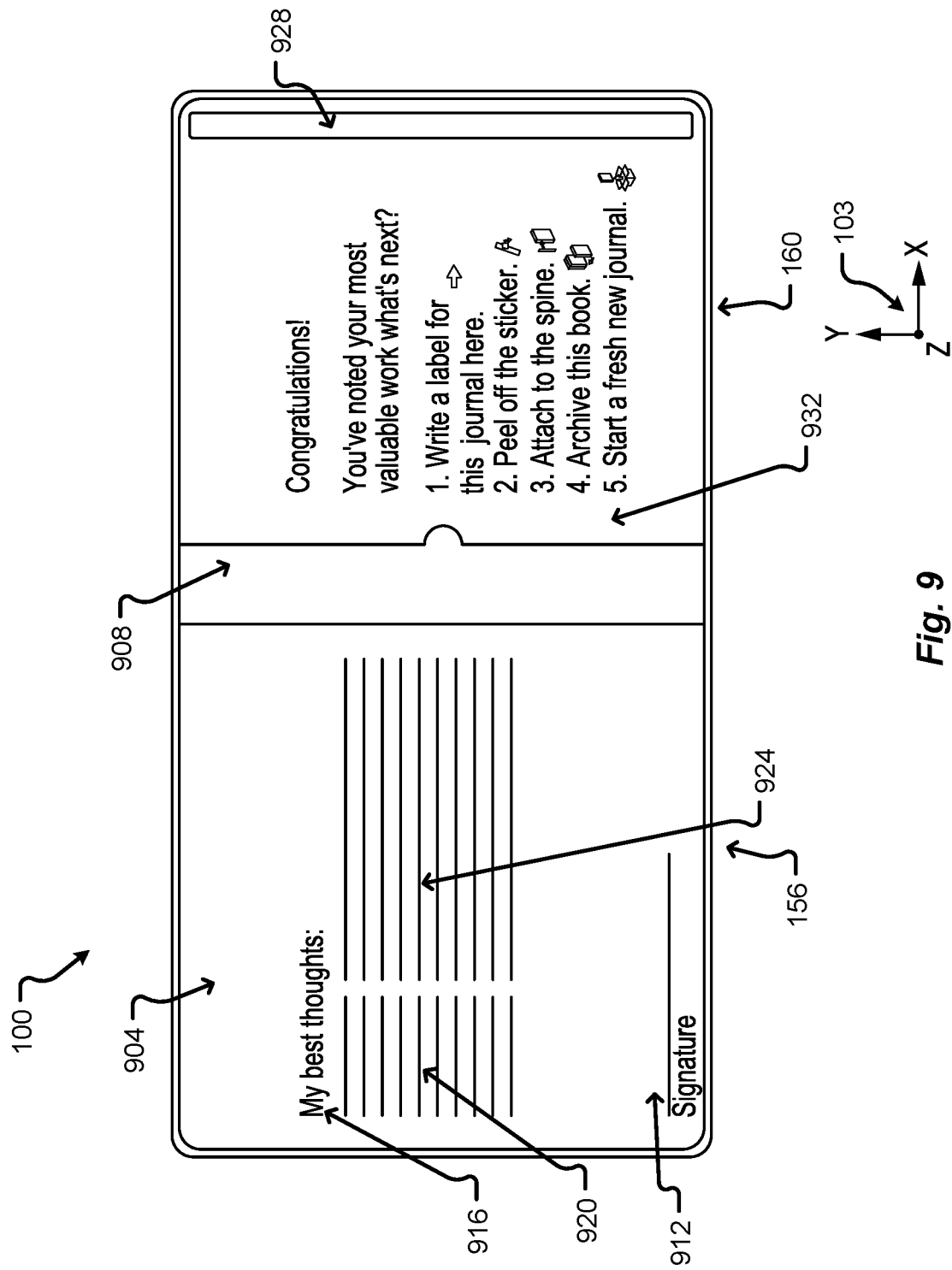
FIG. 9 shows an end page and an inside rear cover in accordance with embodiments of the present disclosure.

Referring to FIG. 9, an end page 904 and an inside rear cover 908 of the notebook 100 are shown in accordance with the embodiments of the present disclosure. The end page 904 may contain an ending section 916 containing written language designed to terminate the use of the notebook 100. In some embodiments, the ending section 916 may contain a congratulations to the user for completion of the notebook 100, as well as guidance for continuing work outside of the notebook 100. In one embodiment, the ending section 916 may be a "best thoughts" section that may allow the user to summarize the best ideas contained in the notebook 100 including a set of page lines 920 and concept lines 924 to write down the page number where the best thought occurred as well as the "best thoughts" concept, respectively. In some embodiments, the end page 904 may contain a signature block 912 to permit the user to sign the end page 904.

The inside rear cover 908 may comprise a concealed pocket cover 932. Similar, if not identical to the concealed pocket cover 206, the concealed pocket cover 932 may provide extra storage for the user and may contain section to store a writing instrument (not shown). The concealed pocket cover 932 may be used, for example, to store a user's notes, credit cards, business cards, identification, receipts, and/or other objects. In one embodiment, the concealed pocket cover 932 may hold the user's objects between the concealed pocket cover 932 and the inside rear cover 908.

The inside rear cover 908 and/or the concealed pocket cover 932 may contain an archival feature 928 to assist in identification purposes. The archival feature 928 may contain a method and process for the user to archive the notebook 100. In one example, archival feature 928 may provide a space (e.g., on a first surface of the archival feature 928) the user to enter (e.g., write, draw, etc.) a notebook number and a date range during which the notebook 100 was used. In one embodiment, the archival feature 928 may be an archival label, or sticker, whereon the user may write the number of the notebook 100, year, or other information (e.g., information about the contents of the notebook 100, owner information, etc.), and may peel off the archival feature 928 and place on the spine 114 of the notebook 100, the front cover 104 of the notebook 100, and/or the rear cover 136 of the notebook 100. In such embodiments, the archival feature 928 may include adhesive on one side to assist in affixing the archival feature 928 to the to the spine 114 of the notebook 100. The archival feature 928 may correspond to a sticker having a writing layer and surface and an adhesive layer disposed opposite the writing layer. In some embodiments, the inside rear cover 908 of the notebook 100 may comprise a release liner layer to which the sticker removably adheres. The release liner layer may correspond to a plastic and/or polyester material that is formed in or on a surface of the inside rear cover 908. In one embodiment, the release liner layer may be disposed under a surface of the inside rear cover 908 of the notebook 100 and a portion of the inside rear cover 908 of the notebook 100 may be cutout to reveal a portion of the release liner layer. The archival feature 928 may be stored in the notebook 100 in a position disposed inside the cutout, where the adhesive layer contacts the release liner layer, until the archival feature 928 is removed for attachment to an outer portion of the notebook 100 as described herein.

Figure 10:
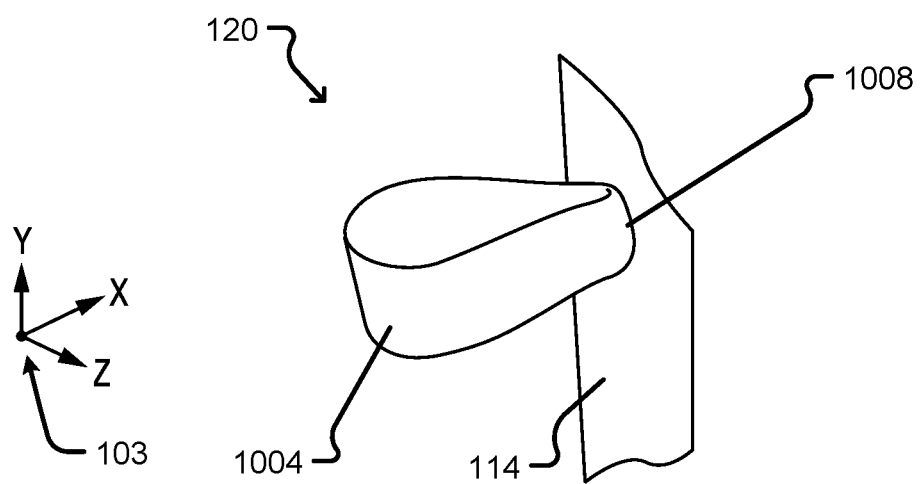
FIG. 10 shows a writing instrument loop in accordance with embodiments of the present disclosure.

FIG. 10 illustrates a pen loop 120 in accordance with embodiments of the present disclosure. The pen loop 120 may include loop threads 1004 and fastening portions 1008. The loop threads 1004 may be attached (e.g., sewn, stitched, etc.) together to provide structural support to the pen loop 120. The fastening portions 1008 may attach the pen loop 120 to the notebook 100. For example, the fastening portions 1008 may be sewn together and bonded, or otherwise attached, to the spine 114 of the notebook 100. The pen loop 120 may be oriented such that a writing instrument (e.g., pencil, pen, marker, etc.), or a portion thereof, may be inserted into the pen loop 120 and be held proximate to or against the notebook 100. In one embodiment, the loop threads 1004 surround the writing instrument circumferentially when the writing instrument is inserted into the pen loop 120 and hold the writing instrument in place.

Additionally or alternatively, the notebook 100 may offer the ability for the user to store a writing instrument 1104 using the elastic band 128. For instance, the notebook 100 may provide a space 1112 into which the user may choose to store the writing instrument 1104 while the notebook 100 is in the closed configuration. In some embodiments, the space 1112 shown in FIGS. 11A-11C may correspond to the space 148 disposed along the opening edge 118 of the notebook 100, as described above. The space 1112 may extend from an edge 1116 (e.g., an edge of an interior page of the notebook 1000) to the opening edge 118 along the X-axis direction and may extend from the inside front cover 204 to the inside rear cover 908 in the Z-axis direction. The space 1112 may also span a portion or the entirety of the notebook 100 in the Y-axis direction (e.g., from the top edge 102A to the bottom edge 102B), such that long writing instruments may still fit within the space 1112.

When storing the writing instrument, the user may align the writing instrument 1104 with the space 1112. In other words, the user may position the writing instrument 1104 above the space 1112 in the Y-axis direction. The user may then maneuver, or otherwise manipulate, the writing instrument 1104 into the space 1112, as indicated by arrow 1108. The writing instrument 1104 may then engage with the elastic band 128 (e.g., the writing instrument may hook onto the elastic band 128). In some embodiments, the notebook 100 may hold the writing instrument 1104 in place using friction. For instance, the writing instrument 1104 may contact one or more surfaces of the notebook 100 (e.g., inside front cover 204, inside rear cover 908, etc.) such that frictional forces hold the writing instrument 1104 within the space 1112. In one embodiment, the writing instrument 1104 may comprise a clip that passes over the elastic band 128 and holds the writing instrument 1104 to the elastic band 128.

Figure 12A:
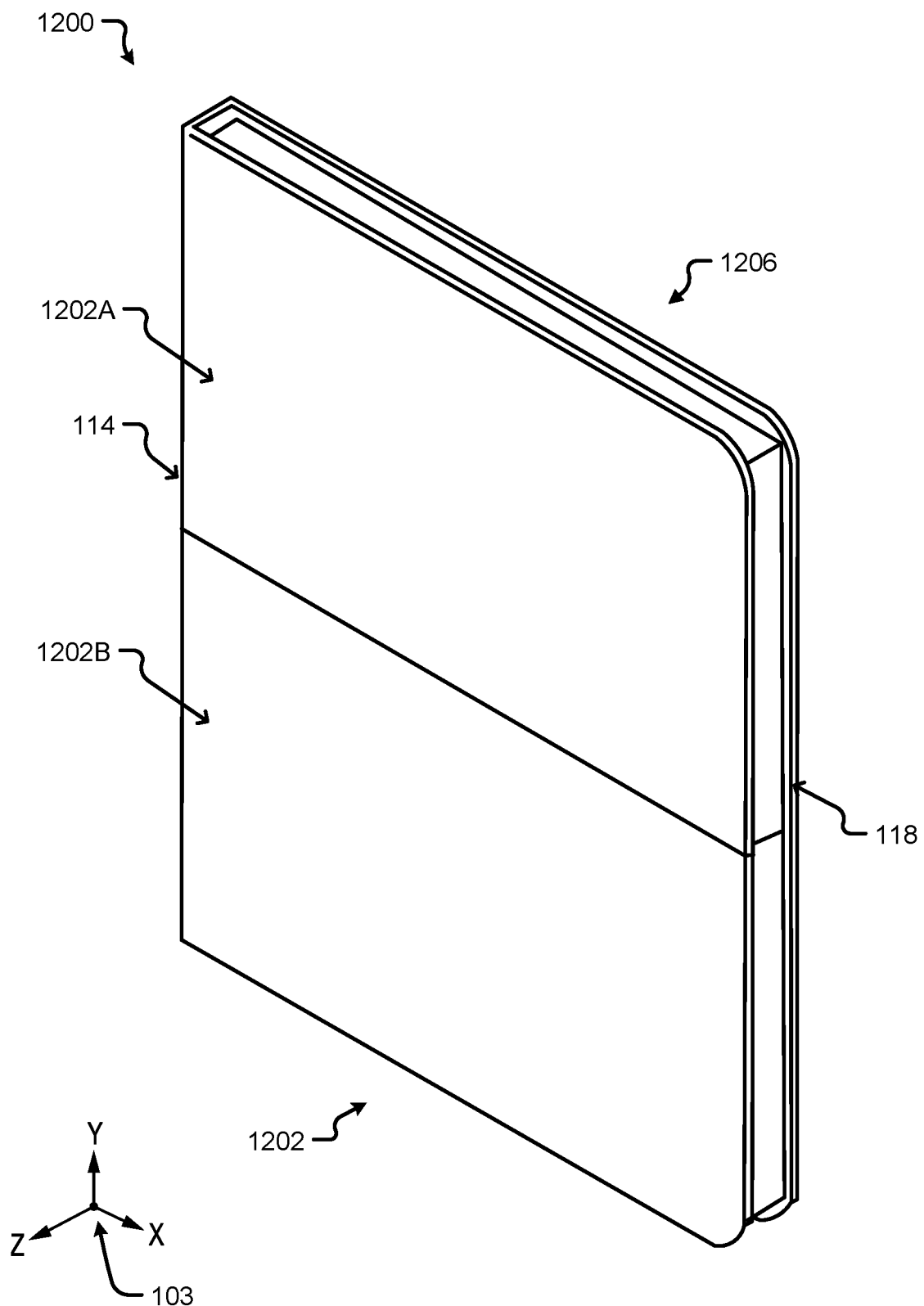
FIGS. 12A-12B show various views of a split notebook including expert guidance features and arrangements in accordance with embodiments of the present disclosure.
Figure 12B:
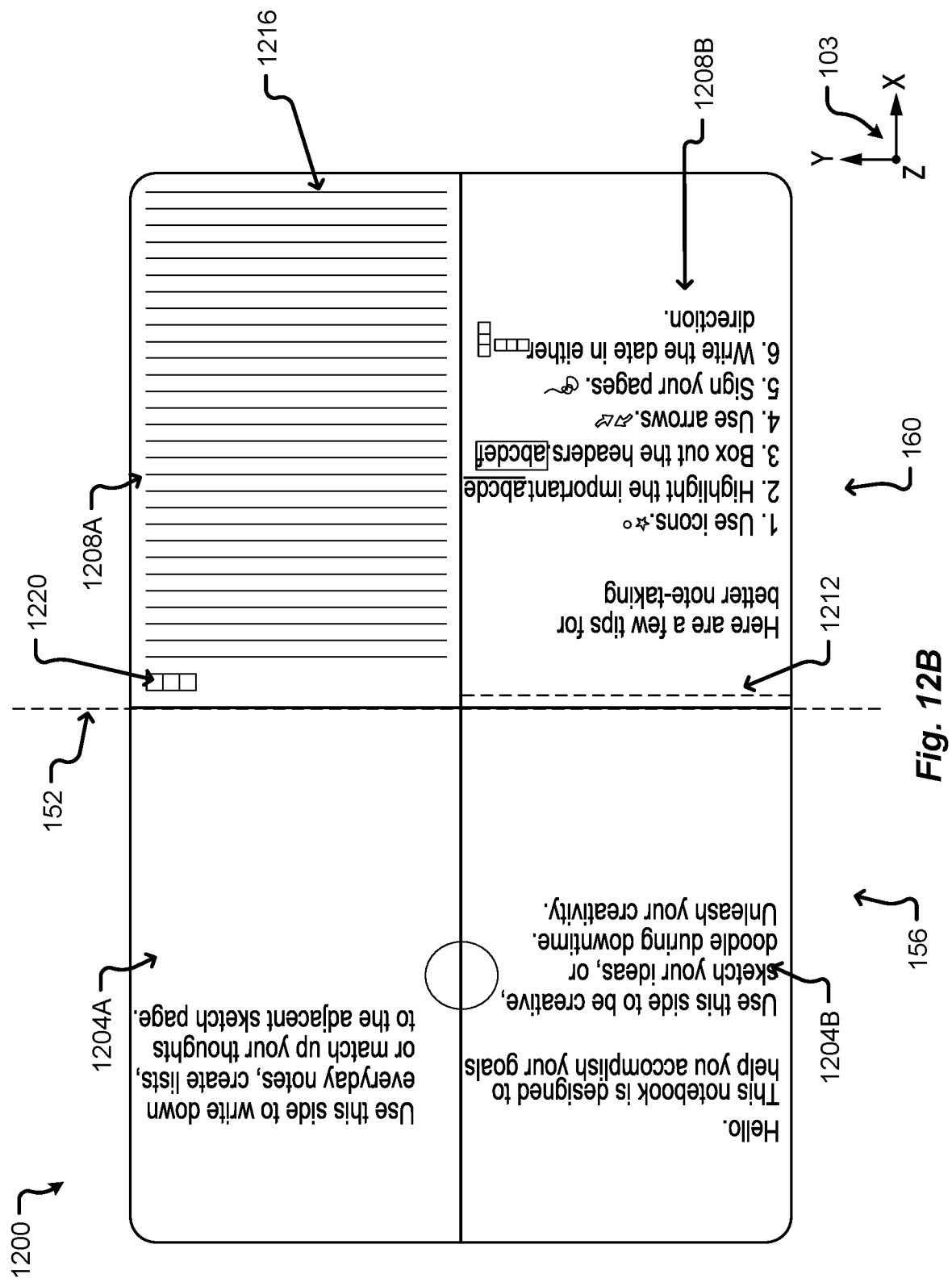

FIGS. 12A-12B show various views of a split notebook 1200. In some embodiments, the split notebook 1200 may correspond to the notebook 100 described above and may include one or more features described in conjunction with FIGS. 1-11. The split notebook 1200 may comprise a split front cover 1202 including upper front cover 1202A and bottom front cover 1202B. The split may extend horizontally (e.g., in the X-axis direction) from the spine 114 to the opening end 118 of the split notebook 1200. Among other things, the divided design of the split notebook 1200 allows one of the upper front cover 1202A and the bottom front cover 1202B of the split notebook 1200 to be opened and/or closed independently of the other portion of the front cover 1202.

FIG. 12B illustrates an example of the split notebook 1200 where both the upper front cover 1202A and the bottom front cover 1202B are opened. The split notebook 1200 may comprise inside front cover pockets 1204A, 1204B, a notebook page 1208A, and a guidance page 1208B. The inside front cover pockets 1204A, 1204B may be used to store the user's perforated papers that have been removed from the notebook 100. In some embodiments, the inside front cover pockets 1204A, 1204B may provide further storage for the user's other paper elements and may contain an additional slot for the storage of a writing instrument (not shown). In one embodiment, the inside front cover pockets 1204A, 1204B may be configured to hold a notetaker's business card, credit card, phone, tablet, and/or the like.

As shown in FIG. 12B, the notebook page 1208A may contain be different note page types (e.g., lined, dotted, blank, etc., and/or combinations thereof). The notebook page 1208A may include different portions with different note page types (e.g., lined, dotted, blank, etc., and/or combinations thereof). The notebook page 1208A may contain page layouts previously described (e.g., note-taking page layouts 500, 600, 700, 800, and/or combinations thereof), including features mentioned therein. In one embodiment, the page 1208A may include a plurality of lines 1216 and a date section 1220. The plurality of lines 1216 may partially or entirely span across the page 1208A. In some embodiments, the plurality of lines 1216 may span in a variety of orientations (e.g., vertically and/or horizontally). The date section 1220 may provide a location for the user to enter a date. The date section 1220 may be similar, if not the same, as any of the date sections previously described (e.g., date section 512). The guidance page 1208B may include similar elements to that of the notebook page 1208A. In one embodiment, the guidance page 1208B comprises expert guidance (e.g., expert guidance page 330 with content 400), allowing the user to view the expert guidance on the page 1208B while taking notes and/or writing on the page 1208A. In one embodiment, the expert guidance included on the guidance page 1208B may include a perforated edge 1212, which may allow the user to detach the expert guidance. The expert guidance may be, for example, stored in one of the inside front cover pockets 1204A, 1204B.

The split notebook 1200 may include a unsplit back cover 1206 (e.g., single-piece, integral, unsplit, undivided, etc.). The unsplit back cover 1206 may provide rigidity to the split notebook 1200 and allow the divided front cover (e.g., the upper front cover 1202A and the bottom front cover 1202B) to be opened and closed repeatedly without tearing at the spine. Moreover, the unsplit back cover 1206 may provide a solid surface upon which a user can support the upper front cover 1202A and/or the bottom front cover 1202B when taking notes, carrying the split notebook 1200, and/or storing the split notebook 1200.

Although the split notebook 1200, the front cover 1202, the upper front cover 1202A, bottom front cover 1202B, and the split between the upper front cover 1202A and the bottom front cover 1202B are shown disposed on the notebook having a certain position, length, width, size, and/or shape, it should be appreciated, that alternative positions, lengths, widths, sizes, and/or shapes may be employed without sacrificing any functionality associated with at least the split notebook 1200, the front cover 1202, the upper front cover 1202A, bottom front cover 1202B, and/or the split between the upper front cover 1202A and the bottom front cover 1202B and, as such, other designs can produce the same, or similar, functional capabilities associated with the split notebook 1200, the front cover 1202, the upper front cover 1202A, bottom front cover 1202B, and the split between the upper front cover 1202A and the bottom front cover 1202B.

The exemplary systems and methods of this disclosure have been described in relation to methods and devices for expert guidance in note-taking. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

References in the specification to "one embodiment," "an embodiment," "an example embodiment," "an exemplary embodiment," "some embodiments," "an aspect," etc., indicate that the embodiment described may include a particular feature, structure, step, or characteristic, but every embodiment may not necessarily include the particular feature, structure, step or characteristic as one or more of the particular features, structures, steps, or characteristics may be optional depending, for example, on a particular implementation or operational environment. Moreover, such phrases are not necessarily referring to the same embodiment. Further, when a particular feature, structure, step, or characteristic is described in conjunction with one embodiment, it is submitted that the description of such feature, structure, step or characteristic may apply to any one or more of the other embodiments described herein.

A number of variations and modifications of the disclosure can be used. It would be possible to provide for some features of the disclosure without providing others.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

As should be appreciated by one skilled in the art, aspects of the present disclosure have been illustrated and described herein in any of a number of patentable classes or context including any new and useful process, machine, manufacture, or composition of matter, or any new and useful improvement thereof.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A notebook, comprising:
   a front cover;
   a back cover;
   a spine disposed between the front cover and the back cover, wherein the front cover and the back cover are both connected to the spine, wherein the notebook has a closed state concealing an interior of the notebook and an open state revealing an interior of the notebook;
   a closure comprising an elastic band that attaches to a portion of the notebook, wherein the closure engages with a first notch disposed in a first material attached to the front cover and a second notch disposed in a second material attached to the back cover in the closed state, wherein the first notch and the second notch are arranged adjacent an opening edge of the notebook at a point between a top edge of the notebook and a bottom edge of the notebook in the closed state; and
   a plurality of note-taking pages disposed in the interior of the notebook, the plurality of note-taking pages comprising an unbound edge extending from a point adjacent the top edge of the notebook to a point adjacent the bottom edge of the notebook, wherein the unbound edge is offset a distance from the opening edge of the notebook providing an open space between the front cover and the back cover and between the unbound edge and the closure adjacent the opening edge of the notebook in the closed state, and wherein the open space is sized to receive a body of a writing instrument inserted into the open space such that the body of the writing instrument is arranged inside a periphery of the notebook in the closed state.

2. The notebook of claim 1, further comprising;
   a magnetic pen loop disposed along a length of the spine, wherein the magnetic pen loop magnetically attaches to the spine and separates from the spine by overcoming a magnetic force holding the magnetic pen loop to the spine.

3. The notebook of claim 1, further comprising:
   an expert note-taking guidance page disposed within the interior of the notebook adjacent the plurality of note-taking pages, the expert note-taking guidance page including information about a plurality of note-taking styles, wherein the information includes a guide on how to use each of the plurality of note-taking styles.

4. The notebook of claim 3, wherein the expert note-taking guide folds out from the interior of the notebook and extends beyond a periphery of at least one of the front cover and the back cover in the open state.

5. The notebook of claim 4, wherein the plurality of note-taking pages follows the expert note-taking guidance page in the notebook, and wherein the plurality of note-taking pages includes different note-taking pages corresponding to at least one note-taking style in the plurality of note-taking styles.

6. The notebook of claim 5, further comprising:
   a corner storage flap disposed on the front cover of the notebook, wherein the corner storage flap extends diagonally from a point adjacent a bottom edge of the front cover to a point adjacent the opening edge of the notebook, and wherein a space between the corner storage flap and the front cover is sized to receive an object.

7. The notebook of claim 6, wherein the corner storage flap is made from an elastic material and is joined to the notebook along the bottom edge of the front cover and along a portion of the opening edge of the notebook.

8. The notebook of claim 7, further comprising:
   a pocket disposed in the interior of the notebook attached to a portion of the front cover.

9. The notebook of claim 8, further comprising:
   a first ribbon marker attached at a first end adjacent the spine of the notebook, wherein the first ribbon marker is free at an opposite second end thereof;
   a second ribbon marker attached at a first end adjacent the spine of the notebook, wherein the second ribbon marker is free at an opposite second end thereof; and
   a third ribbon marker attached at a first end adjacent the spine of the notebook, wherein the third ribbon marker is free at an opposite second end thereof.

10. The notebook of claim 1, wherein the first material comprises a first metal portion of material inset from the top edge of the notebook and the bottom edge of the notebook, and wherein the second material comprises a second metal portion of material inset from the top edge of the notebook and the bottom edge of the notebook.

11. A notebook, comprising:
a front cover;
a rear cover;
a spine positioned between and connecting to the front cover and the rear cover, wherein the front cover is connected to the spine along a front spine edge, wherein the rear cover is connected to the spine along a rear spine edge, wherein the notebook has a closed state concealing an interior of the notebook and an open state revealing an interior of the notebook, wherein the front cover and the rear cover overlap in the closed state;
an elastic band comprising a first end attached to the front cover and a second end attached to the rear cover, wherein the elastic band engages with a first notch disposed in a material attached to the front cover and a second notch disposed in material attached to the rear cover in the closed state, wherein the first notch and the second notch are arranged adjacent an opening edge of the notebook at a point between a top edge of the notebook and a bottom edge of the notebook in the closed state;
a plurality of note-taking pages bound together and attached to at least one of the front cover, the rear cover, and the spine, the plurality of note-taking pages comprising groups of pages arranged by note-taking style, the plurality of note-taking pages comprising an unbound edge extending from a point adjacent the top edge of the notebook to a point adjacent the bottom edge of the notebook, wherein the unbound edge is offset a distance from the opening edge of the notebook providing an open space between the front cover and the rear cover and between the unbound edge and the elastic band adjacent the opening edge of the notebook in the closed state, and wherein the open space is sized to receive a body of a writing instrument inserted into the open space such that the body of the writing instrument is arranged inside a periphery of the notebook in the closed state; and
an expert guidance sheet attached to at least one of the front cover, the rear cover, and the plurality of note-taking pages, the expert guidance sheet comprising a plurality of visual indicia indicative of how to use each note-taking style in the groups of pages of the plurality note-taking pages.

12. The notebook of claim 11, wherein the front cover pivots relative to at least one of the spine and the rear cover, wherein the rear cover pivots relative to at least one of the spine and the front cover, and wherein the notebook is moveable between the closed state where the front cover and the rear cover overlap and face one another and the open state where the front cover and the rear cover are arranged side-by-side on opposing edges of the spine and are each facing a same direction.

13. The notebook of claim 12, wherein the elastic band maintains the notebook in the closed state when engaged with the first notch, the second notch, the front cover, and the rear cover, and wherein the elastic band, when released from at least one of the first notch and the second notch and at least one of the front cover and rear cover, allows unrestricted movement of the front cover relative to the rear cover.

14. The notebook of claim 12, wherein the expert guidance sheet is at least one of inserted into a pocket disposed in the front cover and attached to the plurality of note-taking pages and selectively separable along a perforated separation line.

15. The notebook of claim 14, wherein the plurality of note-taking pages comprises a first group of pages comprising at least one page of a first note-taking style followed by at least one page of a second note-taking style and then followed by at least one page of a third note-taking style, wherein the first note-taking style, the second note-taking style, and the third note-taking style are different from one another and each provide a page area for taking notes according to a corresponding note-taking style illustrated in the visual indicia of the expert guidance sheet.

16. The notebook of claim 15, wherein the at least one page of the first note-taking style comprises a first one of a horizontally-lined area, an unlined sketch area, a dot-grid area, a lined grid area, a split lined and sketch area, and a mind-map area, the at least one page of the second note-taking style comprises a different second one of the horizontally-lined area, the unlined sketch area, the dot-grid area, the lined grid area, the split lined and sketch area, and the mind-map area of the at least one page of the first note-taking style, and wherein the at least one page of the third note-taking style comprises a different third one of the horizontally-lined area, the unlined sketch area, the dot-grid area, the lined grid area, the split lined and sketch area, and the mind-map area of the at least one page of the first note-taking style and the at least one of the second note-taking style.

17. The notebook of claim 16, wherein the split lined and sketch area comprises:
a page number area;
a date section area;
a first section comprising a plurality of horizontal lines;
a second section devoid of horizontal lines; and
a third section comprising a plurality of horizontal lines, the plurality of horizontal lines of the third section spanning a smaller horizontal space than the plurality of horizontal lines of the first section.

18. The notebook of claim 17, further comprising:
a pocket disposed on an outside face of the front cover, wherein the pocket is arranged as a slotted portion of the outside face of the front cover, and wherein the slotted portion extends diagonally from a point adjacent the top edge of the notebook to a point adjacent the spine.

19. The notebook of claim 18, further comprising:
an integrated archival sticker comprising an adhesive layer disposed on a first face and a writing layer disposed on a second face opposite the first face, the integrated archival sticker separably attached via the adhesive layer to a release liner disposed in the notebook and attached to at least one of the front cover, the rear cover, and the plurality of note-taking pages, wherein the integrated archival sticker is arranged adjacent the opening edge of the notebook extending a direction running from the top edge of the notebook to the bottom edge of the notebook.

20. A notebook with integrated writing instrument storage, comprising:
a front cover;
a back cover;

a spine disposed between the front cover and the back cover, wherein the front cover and the back cover are both connected to the spine, wherein the notebook has a closed state concealing an interior of the notebook and an open state revealing an interior of the notebook;

an elastic band attached to a portion of the notebook, wherein the elastic band engages with a first notch disposed in a first material attached to the front cover and a second notch disposed in a second material attached to the back cover in the closed state, wherein the first notch and the second notch are arranged adjacent an opening edge of the notebook at a point between a top edge of the notebook and a bottom edge of the notebook in the closed state; and a plurality of note-taking pages disposed in the interior of the notebook, the plurality of note-taking pages comprising a bound edge arranged adjacent the spine and an unbound edge offset from the bound edge and the spine, the unbound edge extending from a point adjacent the top edge of the notebook to a point adjacent the bottom edge of the notebook, wherein the unbound edge is offset a distance from the opening edge of the notebook providing an open space between the front cover and the back cover and between the unbound edge and the elastic band adjacent the opening edge of the notebook in the closed state, wherein the open space extends from the top edge of the notebook to the bottom edge of the notebook; and a writing instrument comprising a clip attached to a body of the writing instrument, wherein the body of the writing instrument is arranged in the open space, and wherein the clip passes over the elastic band such that the clip is arranged outside of a periphery of the notebook and the body of the writing instrument is arranged inside the periphery of the notebook in the closed state.

\* \* \* \* \*